United States Patent [19]

Araki

[11] Patent Number: 5,419,199
[45] Date of Patent: May 30, 1995

[54] SEMICONDUCTOR DEVICE HAVING A STRESS TRANSDUCER DRIVEN BY A TEMPERATURE COMPENSATING REFERENCE VOLTAGE SOURCE

[75] Inventor: Tohru Araki, Itami, Japan

[73] Assignee: Mitsubishi Denki Kabushiki Kaisha, Tokyo, Japan

[21] Appl. No.: 22,010

[22] Filed: Feb. 24, 1993

[30] Foreign Application Priority Data

Mar. 13, 1992 [JP] Japan ................... 4-054962

[51] Int. Cl.$^6$ .............................. G01L 19/04
[52] U.S. Cl. .................... 73/708; 73/727; 73/862.623
[58] Field of Search ............. 73/721, 727, 766, 708, 73/862.623, 862.625, 862.629, 862.636, 862.68; 338/3, 4; 324/713, 705, 706

[56] References Cited

U.S. PATENT DOCUMENTS

| | | | |
|---|---|---|---|
| 4,480,478 | 11/1984 | Sato et al. | 73/727 X |
| 4,604,899 | 8/1986 | Yamada et al. | 338/4 X |
| 4,765,188 | 8/1988 | Krechmery et al. | 73/727 X |
| 4,911,016 | 3/1990 | Miyazaki et al. | 73/766 |
| 5,053,692 | 10/1991 | Craddock | 73/766 X |
| 5,253,532 | 10/1993 | Kamens | 73/727 X |

FOREIGN PATENT DOCUMENTS 0407587  1/1991  European Pat. Off. .

OTHER PUBLICATIONS

Patent Abstracts of Japan, vol. 10, No. 340, E-455, Nov. 18, 1986, & JP-A-61-144844, Jul. 2, 1986.

*Primary Examiner*—Richard E. Chilcot, Jr.
*Assistant Examiner*—Joseph L. Felber
*Attorney, Agent, or Firm*—Oblon, Spivak, McClelland, Maier & Neustadt

[57] ABSTRACT

A general object of the present invention is to provide a semiconductor device having a stress transducer in which a temperature dependency of sensitivity of the stress transducer which utilizes a piezo resistance effect to transduce stress into an electric signal, and variations in sensitivity of several semiconductor devices can be corrected. The semiconductor device includes a reference voltage source which has a temperature dependency in accordance with a temperature characteristic of sensitivity of the stress transducer which has an electrical bridge circuit exhibiting a piezo resistance effect, and a voltage transducer having resistances and an operational amplifier. Voltage transduced by the voltage transducer is adjusted so as to correct variations in sensitivity of several semiconductor devices.

22 Claims, 19 Drawing Sheets

F I G. 3(a)
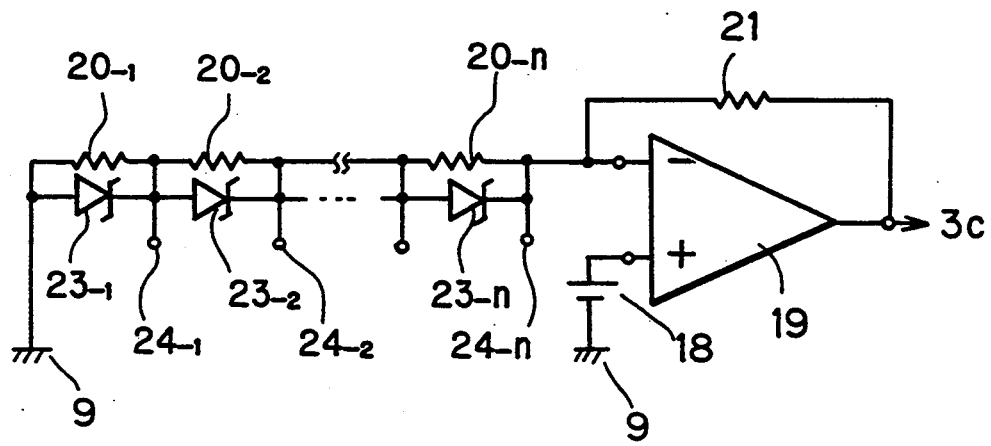
F I G. 3(b)
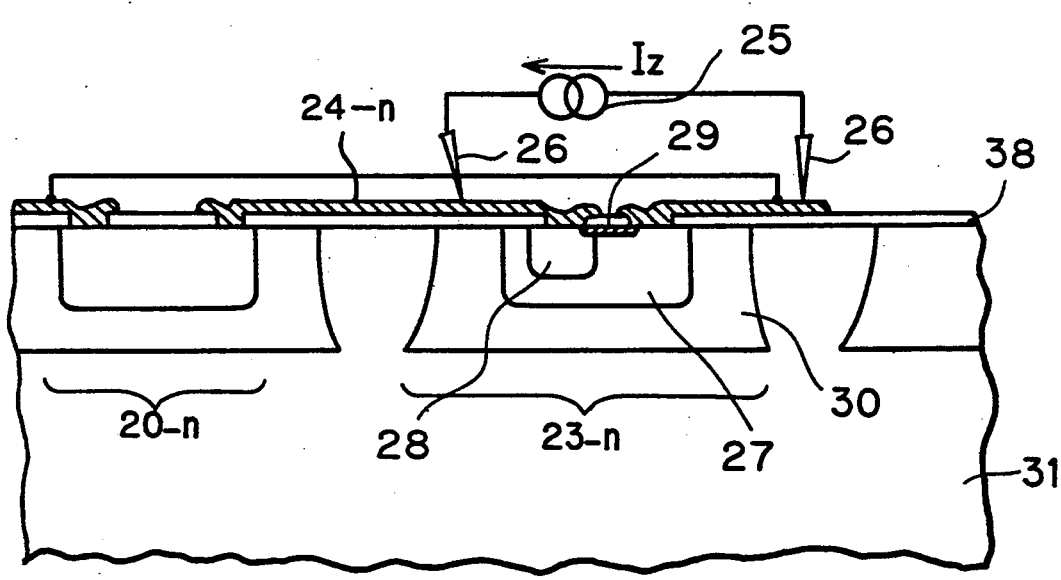

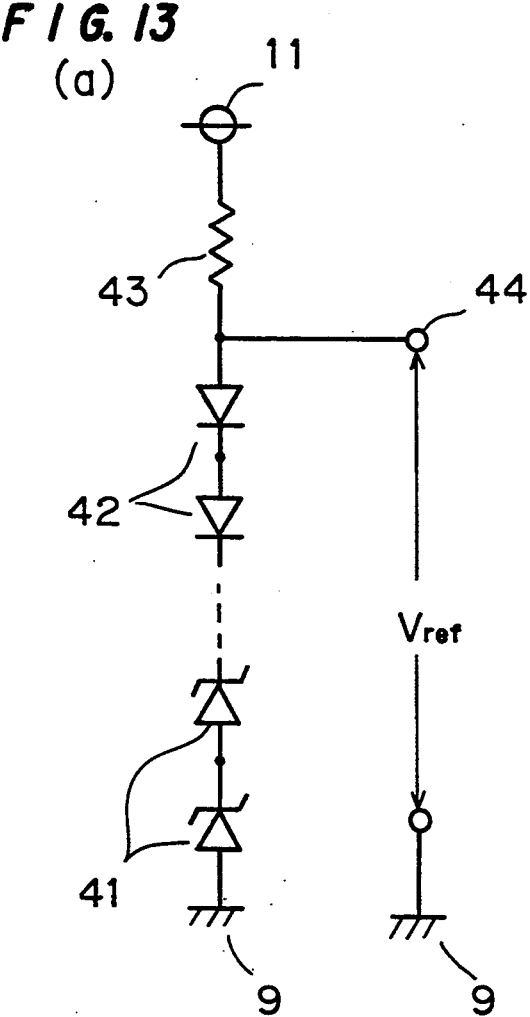
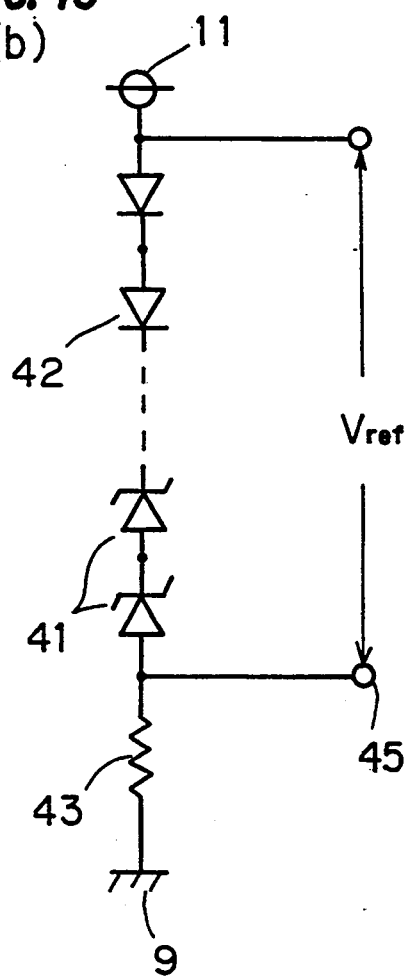
FIG. 13 (a)
FIG. 13 (b)

(a)

(b)

SEMICONDUCTOR DEVICE HAVING A STRESS TRANSDUCER DRIVEN BY A TEMPERATURE COMPENSATING REFERENCE VOLTAGE SOURCE

BACKGROUND OF THE INVENTION

1. Field of the Invention

The present invention relates to a semiconductor device including a stress detector, and more particularly, it relates to means for improving a temperature characteristic of the stress detector and means for correcting variations in sensitivity of several stress detectors in different semiconductor devices, both of which utilize a piezo resistance effect of semiconductor.

2. Description of the Prior Art

A conventional semiconductor device having a stress transducer will be explained with reference to FIGS. 18 and 19. FIGS. 18(a) and 18(b) are a plan view and a side view showing a pressure sensor for as an exemplary semiconductor device. As can be seen, the pressure sensor includes a substrate A for the pressure sensor, peripheral circuit areas ar1 to ar4 formed on the substrate A, a diaphragm ar5 which is transformed by an external pressure to develop stress, strain gauge resistances S1 to S4 which are formed in the diaphragm ar5 and utilize a piezo resistance effect to transduce a variation in the stress of the diaphragm ar5 into a variation in resistance value. The pressure sensor has a bridge circuit consisting of the strain gauge resistance S1 to S4 so as to act as a pressure detector. Reference symbol P designates pressure applied to the pressure sensor.

FIG. 19 is a circuit diagram showing a conventional semiconductor device having a stress transducer which includes a stress detector 1 (e.g., a presure detector for a pressure sensor) which utilizes a piezo resistance effect of semiconductor, and strain gauge resistances 2a, 2b, 2c and 2d of which the stress detector 1 is comprised. For example, strain gauge resistances S1 to S4 shown in FIG. 18 are examples of the strain gauge resistances 2a to 2d. Such strain gauge resistances 2a to 2d are ordinarily made by impurity diffusion. Reference symbol 3a is a node between the strain gauge resistances 2c and 2d while 3b is a node between the strain gauge resistances 2a and 2b, and voltage developed between the nodes 3a and 3b is in proportion to a stress to be detected (e.g., a stress developed because of a transformation of the diaphragm in accordance with a pressure in the pressure sensor, and so forth). The semiconductor device having a stress transducer further includes an operational amplifier 4 for amplifying output voltage $V_{span}$ (differential voltage between the nodes 3a and 3b) of the stress detector 1, resistances 5, 6, 7 and 8 for determining an amplification factor of the operational amplifier 4, grounds 9 to which one of terminals of the resistance 8, etc. are grounded, an output terminal 10 of the operational amplifier 4, a power source 11 for supplying voltage $V_{CC}$ which is used for activating the stress detector 1, a resistance 12 connected between the power source 11 and a node 3c, an operational amplifier 13 having its output terminal connected to a node 3d of the stress detector 1, a non-inversion input terminal 14 of the operational amplifier 13, an inversion input terminal 15 of the operational amplifier 13, a resistance 16 connected between the power source 11 and the non-inversion input terminal 14, and a resistance 17 having its one terminal grounded and the other terminal connected to the non-inversion input terminal 14.

Next, an operation of the semiconductor device will be described. Assuming now that resistance values of the strain gauge resistances 2a, 2b, 2c and 2d are $R_{Ga}$, $R_{Gb}$, $R_{Gc}$, and $R_{Gd}$, potentials at the nodes 3a and 3b are $E_{3a}$ and $E_{3b}$, and potentials at the nodes 3c and 3d are $E_{3c}$ and $E_{3d}$, $E_{3a}$ and $E_{3b}$ are expressed with the potentials $E_{3c}$ and $E_{3d}$ at the nodes 3c and 3d, as follows:

$$E_{3a} = \frac{R_{Gd}}{R_{Gd} + R_{Gc}} \times (E_{3c} - E_{3d}) + E_{3d} \quad (1)$$

$$E_{3b} = \frac{R_{Gb}}{R_{Gb} + R_{Ga}} \times (E_{3c} - E_{3d}) + E_{3d} \quad (2)$$

With the output voltage $V_{span}$ of the stress detector 1, the formulas (1) and (2) lead to the following formula:

$$V_{span} = E_{3a} - E_{3b} = \left( \frac{R_{Gd}}{R_{Gd} + R_{Gc}} - \frac{R_{Gb}}{R_{Gb} + R_{Ga}} \right) \times \quad (3)$$

$$(E_{3c} - E_{3d})$$

under the condition that no stress is applied to the strain gauge resistances 2a, 2b, 2c and 2d of the stress detector 1 (generally, the stress to be detected is zero). For example, stress P applied to a pressure sensor is zero (vacuum), the strain gauge resistances 2a, 2b, 2c and 2d are arranged so as to satisfy $R_{Ga}=R_{Gb}=R_{Gc}=R_{Gd}=R_{G0}$ as to the resistance values of the strain gauge resistances 2a to 2d, the output voltage V is shown as follows:

$$V_{span} = \left( \frac{R_{G0}}{2 \cdot R_{G0}} - \frac{R_{G0}}{2 \cdot R_{G0}} \right) \times (E_{3c} - E_{3d}) = 0 \quad (4)$$

Then, with a stress applied to the stress detector 1 (e.g., pressure is applied to the pressure sensor, or the like), the strain gauge resistances 2a, 2b, 2c and 2d have their respective resistance values varied because of a piezo resistance effect. Assuming that a variation amount is $\Delta R_G$, an adequate arrangement of the strain gauge resistances 2a, 2b, 2c and 2d enables a polarity (positive or negative) of $\Delta R_G$ to be arbitrarily selected. For example, the strain gauge resistances 2a, 2b, 2c and 2d are appropriately arranged with the strain gauge resistances 2a and 2d positive in polarity and the strain gauge resistances 2b and 2c negative in polarity, the strain gauge resistances, when a certain pressure is applied thereto, assume their respective resistance values $R_{Ga}$ to $R_{Gd}$ as in the following formula:

$R_{Ga}=R_{G0}+\Delta R_G$ $R_{Gb}=R_{G0}-\Delta R_G$ $R_{Gc}=R_{G0}-\Delta R_G$ $R_{Gd}=R_{G0}+\Delta R_G \quad (5)$ Then, substituting the formula (5) for the formula (3), the following formula is given:

$$V_{span} = \left( \frac{R_{G0} + \Delta R_G}{2 \cdot R_{G0}} - \frac{R_{G0} - \Delta R_G}{2 \cdot R_{G0}} \right) \times (E_{3c} - E_{3d}) \quad (6)$$

$$= \frac{\Delta R_G}{R_{G0}} \times (E_{3c} - E_{3d})$$

As is obvious from the formula (6), the output voltage $V_{span}$ of the stress detector 1 is in proportion to $\Delta R_G$ when $(E_{3c} - E_{3d})$ is constant because $R_{G0}$ is constant. In other words, output voltage in proportion to the stress applied to the strain gauge resistances 2a, 2b, 2c and 2d is developed.

If $\Delta R_G$ is constant, also the output voltage $V_{span}$ is in proportion to $(E_{3c} - E_{3d})$. Thus, arbitrary sensitivity of the stress detector 1 can be chosen by varying $(E_{3c} - E_{3d})$.

It is generally known that when the strain gauge resistances 2a, 2b, 2c and 2d are formed by impurity diffusion in semiconductor, a resistance changing rate $(\delta R_{G0}/\delta F)$ (where $\delta$ expresses partial differential)) in accordance with the stress F applied to the strain gauge resistances 2a, 2b, 2c and 2d is in proportion to a piezo resistance coefficient. The piezo resistance coefficient exhibits a great temperature dependency, and it also depends upon the kind of the semiconductor where impurity is diffused, a crystal orientation of the resultant strain gauge resistance, and a concentration of diffused impurity. Hence, fixing a manufacturing method and a structure of elements in contrast with the above, a temperature characteristic of the piezo resistance coefficient becomes stable with a temperature coefficient of a fixed value. Transforming the formula (6) with the piezo resistance coefficient, the following formula is given:

$$V_{span}(T) = a \cdot F \cdot \pi(T) \times (E_{3c} E_{3d}) \quad (7)$$

In the formula (7), a is a proportionality constant, F is a stress, $\pi(T)$ is a piezo resistance coefficient, and T is a temperature of the stress detector 1.

Now, with the temperature coefficient $\alpha$ of the piezo resistance coefficient, the following formula is given:

$$\pi(T) = \pi_0 \times (1 - \alpha \cdot T) \approx \frac{\pi_0}{1 + \alpha \cdot T} \quad (8)$$

Specifically, the piezo resistance coefficient has a negative temperature coefficient, and as the temperature rises, the piezo resistance coefficient $\pi$ becomes small. The formula (7) is transformed with the formula (8) as follows:

$$V_{span}(T) = a \cdot F \times \frac{\pi_0}{1 + \alpha \cdot T} \times (E_{3c} - E_{3d}) \quad (9)$$

As has been described, the output voltage $V_{span}$ of the stress detector 1 is in proportion to the stress F applied to the strain gauge resistances 2a, 2b, 2c and 2d and the voltage $(E_{3c} - E_{3d})$ applied to the stress detector 1, and in inverse proportion to the temperature T of the stress detector 1.

The output voltage $V_{span}$ of the stress detector 1 is a differential voltage, and for the purpose of single-ending it for convenience in use, it is differentially amplified by the operational amplifier 4. Assuming that resistance value of the resistances 5, 6, 7 and 8 are $R_5$, $R_6$, $R_7$ and $R_8$, respectively, output voltage $V_{out}$ developed at the output terminal 10 of the operational amplifier 4 can be expressed as follows:

$$V_{out} = \frac{R_8}{R_7 + R_8} \times \frac{R_5 + R_6}{R_5} \times (E_{3a} - 0) - \quad (10)$$

$$\frac{R_6}{R_5} \times (E_{3b} - 0)$$

If $R_5 = R_7$ and $R_6 = R_8$, the following formula is given:

$$V_{out} = \frac{R_6}{R_5} \times (E_{3a} - E_{3b}) = \frac{R_6}{R_5} \times V_{span} \quad (11)$$

In accordance with the formula (11), the differential voltage $V_{span}$ is single-ended by the operational amplifier 4 and so forth, and the voltage $V_{span}$ is further amplified to $(R_6/R_5)$ times.

As the output voltage $V_{span}$ of the stress detector is in inverse proportion to the temperature T of the stress detector 1 as expressed in the formula (9), it is necessary to utilize peripheral circuits of the stress detector 1 to correct the inverse proportion characteristic to the temperature T so that an accuracy of the stress detector 1 can be enhanced. This is implemented by using the resistance 12 and the operational amplifier 13.

Assuming that the resistances 12, 16 and 17 have respective resistance values $R_{12}$, $R_{16}$ and $R_{17}$, potential $E_{14}$ at the non-inversion input terminal 14 of the operational amplifier 13 is given by the following formula:

$$E_{14} = \frac{R_{17}}{R_{16} + R_{17}} \times V_{cc} + 0 \quad (12)$$

In this formula, $V_{cc}$ is a voltage between a potential of the power source 11 and the ground. Then, the potential $E_{3c}$ is given by the following formula:

$$E_{3C} = E_{14} = \frac{R_{17}}{R_{16} + R_{17}} \times V_{cc} \quad (13)$$

Thus, current $I_G$ flowing in the resistance 12 is given by the following formula:

$$I_G = \frac{V_{cc} - E_{3c}}{R_{12}} = \frac{V_{cc}}{R_{12}} \times \frac{R_{16}}{R_{16} + R_{17}} \quad (14)$$

The current $I_G$ flows in a bridge circuit, and therefore, there is a relation as expressed in the following formula:

$$E_{3c} - E_{3d} = R_{G0} I_G \quad (15)$$

Substituting the formulas (9), (14) and (15) for the formula (11), the following formula is given:

$$V_{out} = \frac{R_6}{R_5} \times a \cdot F \times \frac{\pi_0}{1 + \alpha \cdot T} \times R_{G0} \times \quad (16)$$

$$\frac{R_{16}}{R_{12} \times (R_{16} + R_{17})} \times V_{cc}$$

The stress detector 1 has its specific proportional constant a, and in order to coordinate its variations in constant of several stress detectors in different semicoonductor devices, any of the $R_5$, $R_6$, $R_{12}$, $R_{16}$ and $R_{17}$ may be adjusted. Conventionally, however, the resistance $R_{17}$ is generally adjusted. $R_{GOO}$ is the resistance value $R_{GO}$ at the reference temperature while T is equal to a difference between an environmental temperature and the reference temperature. For instance, $R_{GOO}$ is the resistance value at 0° C. and T is an environmental temperature expressed in ° C.

The strain gauge resistances 2a, 2b, 2c and 2d have a positive temperature coefficient B because they are made by the impurity diffusion into semiconductor. Thus, the resistance value $R_{GO}$ of the strain gauge resistances 2a to 2d is expressed as follows:

$$R_{GO} = R_{GOO} \times (1 + \beta \cdot T) \qquad (17)$$

Substituting the formula (17) for the formula (16), the following is obtained:

$$V_{out} = \frac{R_6}{R_5} \times a \cdot F \cdot \pi_0 \times \frac{1 + \beta \cdot T}{1 + a \cdot T} \times R_{GOO} \times \frac{R_{16}}{R_{12} \times (R_{16} + R_{17})} \times V_{cc} \qquad (18)$$

As will be recognized from the formula (18), if the resistance 12 has no temperature dependency, and setting impurity concentrations of the strain gauge resistances 2a, 2b, 2c and 2d so as to satisfy $\alpha = \beta$, the output voltage $V_{out}$ no longer depends upon a temperature. Even if the resistances 5, 6, 7 and 8 are also made by the impurity diffusion into semiconductor and have respective temperature dependencies, they are cancelled by one another if they are identical in temperature coefficient. Similarly, the resistances 16 and 17 can be cancelled by each other if they are identical in temperature coefficient.

Thus, choosing appropriate impurity concentrations of the strain gauge resistances 2a, 2b, 2c and 2d, the temperature coefficient $\beta$ of the resistance value $R_{GO}$ of the strain gauge resistances 2a to 2d is equal to the temperature coefficient $\alpha$ of the piezo resistance coefficient $\pi$, and using the resistance 12 of a small temperature coefficient and appropriately adjusting the resistances 16 and 17, a temperature characteristic of the stress detector 1 and variations in sensitivity among several stress detectors in different semiconductor devices are corrected, so that a semiconductor device with high accuracy can be obtained.

Since the conventional semiconductor device is configured as mentioned above, the temperature coefficient $\beta$ of the strain gauge resistances 2a, 2b, 2c and 2d must be set so as to be equal to the temperature coefficient $\alpha$ of the piezo resistance coefficient $\pi$, and this is very difficult. Also, since the resistance $R_{12}$ of a small temperature coefficient is required for producing a constant current $I_G$ which is not affected by temperature, the resistance $R_{12}$ is formed of a thin film resistance, for example. This brings great obstacles to form a semiconductor device including the strain gauge resistance 2a to 2d of diffusion resistances and the thin film resistance $R_{12}$ on a single semiconductor chip; e.g., a manufacturing process of the semiconductor is device is complicated.

SUMMARY OF THE INVENTION

According to the present invention, a semiconductor device having a stress transducer comprises a substrate; a stress transducer formed on the substrate and having a voltage input terminal, for transducing stress into an electric signal by a drive voltage applied to the voltage input terminal and a piezo resistance effect; a reference voltage source formed on the substrate for developing reference voltage having a temperature coefficient which compensates a temperature coefficient of a sensitivity of the stress transducer; and a voltage transducer connected between the voltage input terminal of the stress transducer and the reference voltage source, for receiving and transducing the reference voltage to apply the transduced voltage to the stress transducer as the drive voltage.

Preferably, the substrate includes an element for developing stress in accordance with the pressure applied from the outside, and the stress transducer includes a bridge circuit which is comprised of voltage dropping means formed on the element of the substrate and having a piezo resistance effect.

Also preferably, the bridge circuit of the stress transducer is activated by the drive voltage, and the reference voltage at the reference voltage source has a positive temperature coefficient.

Further preferably, the reference voltage source includes a current source, and at least one constant voltage diode having a positive temperature coefficient, connected in series between first and second terminals of the current source in a reverse direction.

Still further preferably, the reference voltage source includes at least one diode having a negative temperature coefficient, connected in series between first and second terminals of the current source in a forward direction.

Yet preferably, the reference voltage source includes a current source; a first node connected to the first terminal of the current source; a second node connected to the second terminal of the current source; first, second and third voltage dropping means having their respective first terminals connected to the first node; a first bipolar transistor having its first electrode connected to a second terminal of the first voltage dropping means, its second electrode connected to the second node, and its control electrode connected to the first or second electrode of itself; a second bipolar transistor having its first electrode connected to a second terminal of the second voltage dropping means, and its control electrode connected to the control electrode of the first bipolar transistor; fourth voltage dropping means having its first terminal connected to a second electrode of the second bipolar transistor and its second terminal connected to the second node; and a third bipolar transistor having its first electrode connected to a second terminal of the third voltage dropping means, its control electrode connected to the first electrode of the second bipolar transistor, and its second electrode connected to the second node; a potential difference between the first and second nodes being the reference voltage.

Yet preferably, the stress transducer includes a second voltage input terminal for receiving a second voltage smaller in absolute value than the drive voltage, the bridge circuit of the stress transducer is activated by a differential voltage between the second voltage and the drive voltage, and the reference voltage of the reference voltage source has a positive temperature coefficient.

Still yet preferably, the stress transducer includes a third voltage input terminal for receiving a third voltage larger in absolute value than the drive voltage, the bridge circuit of the stress transducer is activated by a differential voltage between the third voltage and the drive voltage, and the reference voltage of the reference voltage source has a negative temperature coefficient.

Also preferably, the reference voltage source includes a current source, and at least one constant voltage diode having a negative temperature coefficient, connected in series between first and second terminals of the current source in a reverse direction.

Further preferably, the reference voltage source includes a current source, and at least one diode having a negative temperature coefficient, connected in series between first and second terminals of the current source in a forward direction.

Still preferably, the reference voltage source includes a current source; a first node connected to the first terminal of the current source; a second node connected to the second terminal of the current source; first, second and third voltage dropping means having their respective first terminals connected to the first node; a first bipolar transistor having its first electrode connected to a second terminal of the first voltage dropping means, its second electrode connected to the second node, and its control electrode connected to the first or second electrode of itself; a second bipolar transistor having its first electrode connected to a second terminal of the second voltage dropping means, and its control electrode connected to the control electrode of the first bipolar transistor; fourth voltage dropping means having its first terminal connected to a second electrode of second bipolar transistor and its second terminal connected to the second node; and a third bipolar transistor having its first electrode connected to a second terminal of the third voltage dropping means, its control electrode connected to the first electrode of the second bipolar transistor, and its second electrode connected to the second node; a potential difference between the first and second nodes being a reference voltage.

Still yet preferably, the reference voltage source includes a current source; a first node connected to a first terminal of the current source; a second node connected to a second terminal of the current source; first, second and third voltage dropping means having their respective first terminals connected to the first node; a first bipolar transistor having its first electrode connected to a second terminal of the first voltage dropping means, and its control electrode connected to the first or second electrode of itself; a second bipolar transistor having its first electrode connected to a second electrode of the first bipolar transistor, its second electrode connected to the second node, and its control electrode connected to the first or second electrode of itself; a third bipolar transistor having its first electrode connected to a second terminal of the second voltage dropping means, and its control electrode connected to the control electrode of the first bipolar transistor; a fourth bipolar transistor having its first electrode connected to a second electrode of the third bipolar transistor, and its control electrode connected to the first or second electrode of itself; fourth voltage dropping means having its first terminal connected to a second electrode of the fourth bipolar transistor, and its second terminal connected to the third node; and a fifth bipolar transistor having its first electrode connected to a second terminal of the second voltage dropping means, its control electrode connected to the first electrode of the fourth bipolar transistor, and its second electrode connected to the second node; a potential difference between the first and second nodes being a reference voltage.

Still further preferably, the bridge circuit includes a first node connected to the voltage input terminal; first voltage dropping means having its first terminal connected to the first node and having a piezo resistance effect; second voltage dropping means having its first terminal connected to the first node and having a piezo resistance effect; a second node connected to a second terminal of the first voltage dropping means; a third node connected to a second terminal of the second voltage dropping means; third voltage dropping means having its first terminal connected to the second node and having a piezo resistance effect; fourth voltage dropping means having its first terminal connected to the third node and having a piezo resistance effect; and a fourth node connected to second terminals of the third and fourth voltage dropping means and connected to the second voltage input terminal; a potential difference between the second and third nodes being utilized for detecting stress.

Preferably, the voltage transducer includes first voltage dropping means variable in resistance value; an operational amplifier having a non-inversion input terminal for receiving output from the reference voltage source which develops the reference voltage and having an inversion input terminal connected to a second terminal of the first voltage dropping means; and second voltage dropping means having its first terminal connected to an output terminal of the operational amplifier and its second terminal connected to the inversion input terminal of the operational amplifier; resistance values of the first and second voltage dropping means having an identical temperature coefficient; the drive voltage being output from the output terminal of the operational amplifier.

Preferably, the first voltage dropping means includes a resistance, and a fuse connected in series to the resistance, and the fuse is selectively broken so as to be able to vary a resistance value of the first voltage dropping means.

Also preferably, the fuse is selectively broken by laser.

Preferably, the first voltage dropping means includes a resistance and a diode connected in parallel with the resistance so as to receive reverse voltage, and the diode is selectively short-circuited to be able to vary a resistance value of the first voltage dropping means.

Preferably, reverse voltage is applied to the diode so as to cause current to flow therein and brake it, so that a short region is formed in a pn junction of the diode to short-circuit the diode.

Also preferably, the first voltage dropping means includes a non-volatile memory, a resistance, and a switching element connected in series to the resistance to be conductive or non-conductive in accordance with information stored in the non-volatile memory, and information is stored in the non-volatile memory and the switching element selectively turning to be conductive or non-conductive so that a resistance value of the first voltage dropping means can be varied.

Preferably, the voltage transducer includes a non-volatile memory; a digital-analog converter receiving output from the reference voltage source at its input terminal for transducing the reference voltage in accordance with information stored in the non-volatile memory to output it; and a voltage follower circuit having its input terminal connected to an output terminal of the digital-analog converter for applying the drive voltage to the stress transducer.

Further preferably, the bridge circuit includes first and second nodes connected to the voltage input terminal; first voltage dropping means having its first terminal connected to the first node and having a piezo resistance effect; second voltage dropping means having its first terminal connected to the first node and having a piezo resistance effect; a third node connected to a second terminal of the first voltage dropping means; a fourth node connected to a second terminal of the second voltage dropping means; third voltage dropping means having its first terminal connected to the second node and its second terminal connected to the second node and having a piezo resistance effect; and fourth voltage dropping means having its first terminal connected to the third node and its second terminal connected to the second node and having a piezo resistance effect; a potential difference between the second and third nodes being utilized for detecting stress.

Still preferably, the voltage dropping means is a diffusion resistance formed by diffusing impurity into semiconductor.

The reference voltage source in the present invention develops reference voltage having a certain temperature coefficient. The developed reference voltage is selectively transduced by the voltage transducer in accordance with sensitivity of the stress detector to apply it to the stress detector. Variations in the sensitivity of stress detectors can be corrected by appropriately adjusting voltage applied as drive voltage to the stress detectors in the voltage transducer. A temperature coefficient of the strain gauge resistances of which the stress detector is comprised is compensated with a temperature coefficient of the reference voltage developed by the reference voltage source formed on the same substrate, and hence, the stress detector can be formed indifferent of a circuit for correcting a temperature dependency of the stress detector. Also, the drive voltage itself is subjected to temperature compensation, constant current, for example, flowing in the bridge circuit in the prior art embodiment is no longer required, and therefore, a resistance of small temperature dependency is also no longer required.

Accordingly, it is a general object of the present invention to provide a semiconductor device which can be easily manufactured without the requirement that a temperature coefficient of strain gauge resistances should be equal to a temperature coefficient of a piezo resistance coefficient and which no longer requires a resistance of a small temperature coefficient and is low-priced.

These and other objects, features, aspects and advantages of the present invention will become more apparent from the following detailed description of the present invention when taken in conjunction with the accompanying drawings.

BRIEF DESCRIPTION OF THE DRAWINGS.

FIG. 3 is a circuit diagram showing a semiconductor device having a stress transducer according to a third embodiment of the present invention;

FIG. 13 is a circuit diagram showing a reference voltage source which utilizes an avalanche diode, according to the present invention;

DESCRIPTION OF THE PREFERRED EMBODIMENT

Figure 1:
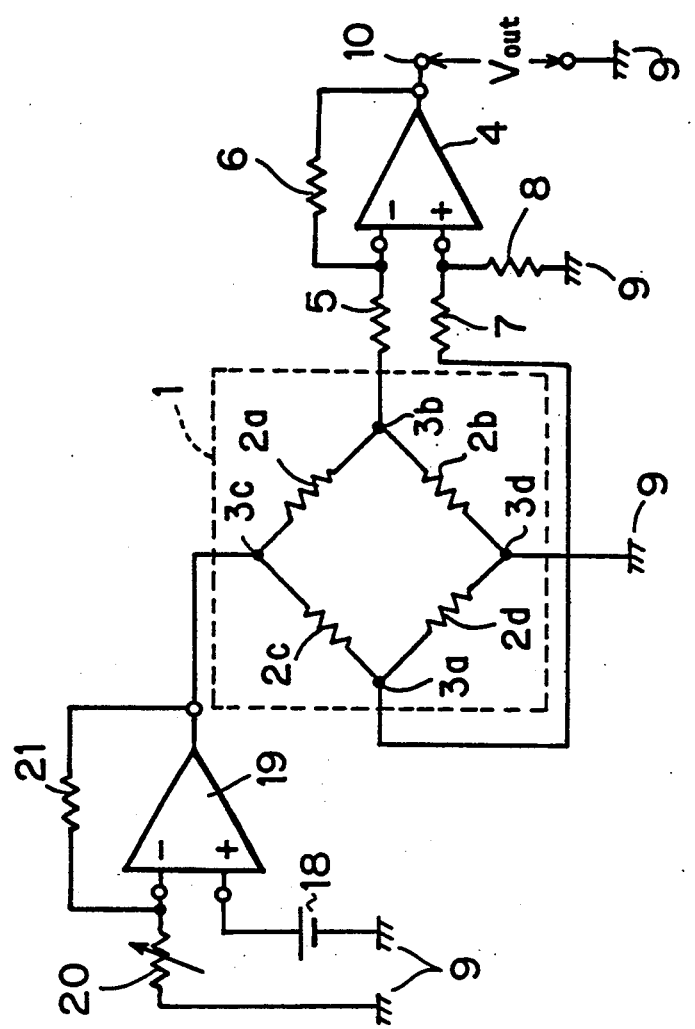
FIG. 1 is a circuit diagram showing a semiconductor device having a stress transducer according to a first embodiment of the present invention.

A first preferred embodiment of the present invention will now be described with reference to FIG. 1. FIG. 1 is a circuit diagram showing a semiconductor device according to the first preferred embodiment of the present invention. In FIG. 1, the semiconductor device having a stress transducer includes a stress detector 1 which has a bridge circuit consisting of strain gauge resistances $2a$, $2b$, $2c$ and $2d$, a node $3c$ between the strain gauge resistances $2a$ and $2c$, a node $3d$ between the strain gauge resistances $2b$ and $2d$, a node $3a$ between the strain gauge resistances $2c$ and $2d$, and a node $3b$ between the strain gauge resistances $2a$ and $2b$, and a voltage developed between the nodes $3a$ and $3b$ is in proportion to stress to be detected. The semiconductor voltage developed between the nodes $3a$ and $3b$ is in proportion to stress to be detected. The semiconductor device having a stress transducer also includes an operational amplifier 4 for amplifying output voltage $V_{span}$ (differential voltage between the nodes 3a and 3b) of the stress detector 1, resistances 5, 6, 7 and 8 for determining an amplification factor of the operational amplifier 4, grounds 9 to which a first terminal of the resistance 8, the node 3d, and so forth are grounded, and an output terminal 10 of the operational amplifier 4. The differential voltage between the nodes 3a and 3b is single-ended by the operational amplifier 4 and so forth, and the voltage $V_{span}$ is amplified to $(R_6/R_5)$ times and output voltage $V_{out}$ is output. A reference voltage source 18 develops reference voltage having a positive temperature coefficient, and this can be easily implemented with a band gap type reference voltage source or an avalanche diode, for example. The semiconductor device having a stress transducer further includes an operational amplifier 19 for amplifying the reference voltage of the reference voltage source 18, resistances 20 and 21 for determining an amplification factor of the operational amplifier 19. The reference voltage source 18 has its negative electrode grounded and its positive electrode connected to a non-inversion amplification terminal of the operational amplifier 19. The resistance 20 has its first terminal grounded and its second terminal connected to an inversion input terminal of the operational amplifier 19. The resistance 21 has its first terminal connected to an output terminal of the operational amplifier 19. The resistance 21 has its first terminal connected to an output terminal of the operational amplifier 19 and its second terminal connected to the inversion input terminal of the operational amplifier 19 to negatively feed back the voltage of the output terminal. The operational amplifier 19 has its output terminal connected to the node 3c to apply drive voltage to a bridge circuit consisting of the strain gauge resistances 2a, 2b, 2c and 2d.

Then, an operation of the semiconductor device having a stress transducer will be described. Assuming now that voltage at the reference voltage source 18 is $V_{ref}(T)$ given by the following formula:

$$V_{ref}(T) = V \times (1\ 30\ \gamma \cdot T) \quad (19)$$

Although $V_{ref}(T)$ is amplified by the operational amplifier 19, output voltage $V_{19}$ of the operational amplifier 19 can be expressed by the following formula, where resistance values of the resistances 20 and 21 are $R_{20}$ and $R_{21}$:

$$V_{19} = \left(1 + \frac{R_{21}}{R_{20}}\right) \times V_{ref}(T) \quad (20)$$

Potential $E_{3c}$ at the node 3c is $(V_{19}+0)$ and output voltage $V_{span}$ of the bridge circuit of the stress detector 1 can be given by the formula (9). Since the node 3d is grounded in FIG. 1, $E_{3d}=0$. Substituting the formulas (19) and (20) for the formula (9) leads the following formula:

$$V_{span}(T) = a \cdot F \times \frac{\pi_0}{1 + a \cdot T} \times \left(1 + \frac{R_{21}}{R_{20}}\right) \times \quad (21)$$

$$V_{ref0} \times (1 + \gamma \cdot T) =$$

$$a \cdot F \cdot \pi_0 \times \left(1 + \frac{R_{21}}{R_{20}}\right) \times V_{ref0} \times \frac{1 + \gamma \cdot T}{1 + a \cdot T}$$

As can be seen, setting a temperature coefficient of the reference voltage source 18 so as to satisfy $a=\gamma$, a temperature dependency of the sensitivity of the stress detector 1 can be compensated in the formula (21). Also, variations in sensitivity of several stress detectors 1 in different semiconductor devices having a stress transducer (variations $a \cdot \pi_0$) can be corrected by adjusting the resistance value of the resistance 20. Thus, it is no longer required making a temperature coefficient $\beta$ of resistance values of the strain gauge resistances 2a to 2d equal to a temperature coefficient $a$ of the piezo resistance coefficient unlike the prior art, and consequently, fabrication of the device is fasilitated.

The resistances 20 and 21 generally have their respective resistance values with temperature coefficients, and since they cancel to each other if identical in temperature coefficient, the resistances 21 and 22, if formed of thin film resistances of, for example, NiCr having an identical temperature coefficient, can be formed on a single semiconductor chip together with the stress detector 1, the operational amplifiers 4 and 19, the reference voltage source 18, and the resistances 5, 6, 7 and 8 (in this case, formed by impurity diffusion). Adjustment of the resistance 20 can be performed by trimming with laser or the like.

Figure 2:
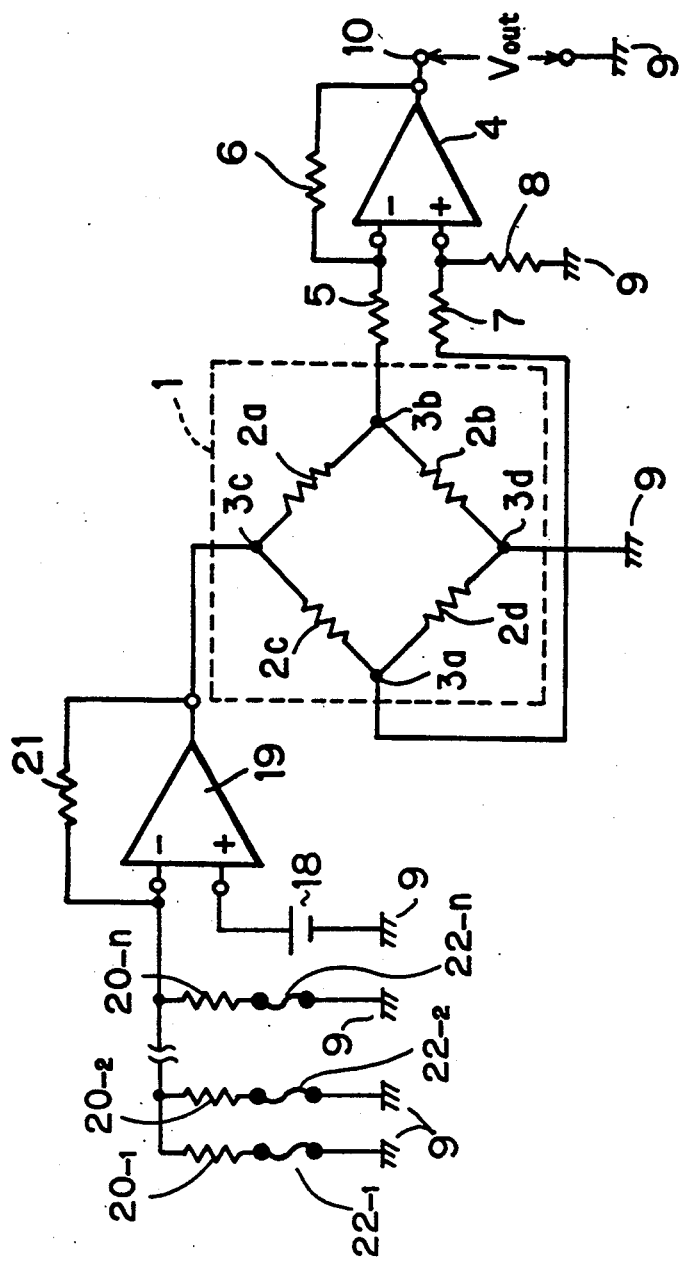
FIG. 2 is a circuit diagram showing a semiconductor device having a stress transducer according to a second embodiment of the present invention.

A second preferred embodiment of the present invention will be described with reference to FIG. 2. In FIG. 2, a semiconductor device having a stress transducer includes a diffusion resistance 21 formed by impurity diffusion, diffusion resistances $20_{-1}$ to $20_{-n}$ having their respective first terminals grounded and their respective second terminals connected to an inversion input terminal of an operational amplifier 19 in a ladder shape and having the same impurity concentration with the resistance 21, and fuses $2_{-1}$ to $22_{-n}$ provided in series between the resistances $20_{-1}$ to $20_{-n}$ and grounds. These fuses are formed of aluminum, polysilicon, or the like, for example. The resistances $20_{-1}$ to $20_{-n}$ and the fuses $22_{-1}$ to $22_{-n}$ together function for adjusting the resistance value of the resistance 20 shown in FIG. 1. Reference symbols similar to those in FIG. 1 denote equivalent or corresponding components to those of FIG. 1, and respective connections are also similar to FIG. 1. Although the resistances 20 and 21 of thin film are employed for correcting variations in sensitivity of several stress detectors 1 in the first preferred embodiment, fuses of the semiconductor device having a stress transducer shown in FIG. 2 are selectively broken with laser or the like in accordance with variations in sensitivity of several stress detectors 1 in this second preferred embodiment. This allows resistance values between the inversion input terminal of the operational amplifier 19 and grounds in a resistance network consisting of the resistance $20_{-1}$ to $20_{-n}$ to be varied, and consequently, the variations in sensitivity of the stress detectors 1 in different semiconductor devices having a stress transducer can be corrected. In other words, each of the resistances $20_{-1}$ to $20_{-n}$ and each of the fuses $22_{-1}$ to $22_{-n}$ are combined in a pair so as to function as a single element for adjusting a resistance value. Hereinafter, such an element is referred to as a resistance value adjusting element.

Then, a third preferred embodiment of the present invention will be described with reference to FIG. 3. FIG. 3 (a) is a circuit diagram partially showing a semiconductor device having a stress transducer according to the third preferred embodiment. Referring to the figure, resistances $20_{-1}$ to $20_{-n}$ are connected in series between a non-inversion input terminal of an operational amplifier 19 and a ground, respectively. Each of the resistances $20_{-1}$ to $20_{-n}$ is connected in parallel with each of zener diodes $23_1$ to $23_{-n}$ in a reverse direction. Each of the zener diodes $23_{-1}$ to $23_{-n}$ has its anode and cathode provided with each of pads $24_{-1}$ to $24_{-n}$ on an insulating film 38 for causing current to flow in the zener diodes $23_{-1}$ to $23_{-n}$. The resistances $20_{-1}$ to $20_{-n}$ and a resistance 21, for example, can be formed by impurity diffusion as in the second preferred embodiment. Parts not shown in FIG. 3 indicate equivalent or corresponding parts to those shown in FIG. 1, and connect ions among them are also similar to those of FIG. 1. A pair of probes 26 of tungsten or the like connected to a current source 25 is brought into contact selectively with a pair of pads $24_{-1}$ and $24_{-2}$, a pair of the pads $24_{-2}$ and $24_{-3}$, or the like in accordance with variations in sensitivity of several stress detectors 1. In this way, each zener diode, $23_{-2}$, $23_{-3}$, or the like, has its anode and cathode connected to the current source 25 so as to cause current Iz to flow in each zener diode, $23_{-2}$, $23_{31}$ $_3$, or the like, and short it. Then, variations in sensitivity of the stress detectors 1 can be corrected by varying a resistance value of a resistance network connected between the non-inversion input terminal of the operational amplifier 19 and the ground. Specifically, in a circuit shown in FIG. 3, one of the resistances $20_{-1}$ to $20_{-n}$ and one of the zener diodes $23_1$ to $23_{-n}$ connected in parallel with it together function as a single resistance value adjusting element. FIG. 3(b) shows a state of such a function. Anodes of the zener diodes $23_1$ to $23_{-n}$ can be formed by p-type impurity diffusion and their cathodes can be formed by n-type impurity diffusion. Usually, a p-type impurity diffusion region 27 is formed in the same stage with base regions of other transistors while an n-type impurity diffusion region 28 is formed in the same stage with emitter regions of those transistors, and a short region 29 can be formed by causing the current Iz of the current source 25 to flow. In this embodiment, it is desirable that breakdown voltage at the zener diodes $23_1$ to $23_{-n}$ is higher than voltage at a reference voltage source 18. If so, even with only one zener diode remaining without short-circuiting, they are safe; no malfunction arises. Reference numeral 30 designates an n-type epitaxial layer, and 31 denotes a p-type separating layer for separating the zener diodes $23_{-1}$ to $23_{-n}$ from other circuit elements.

Figure 4:
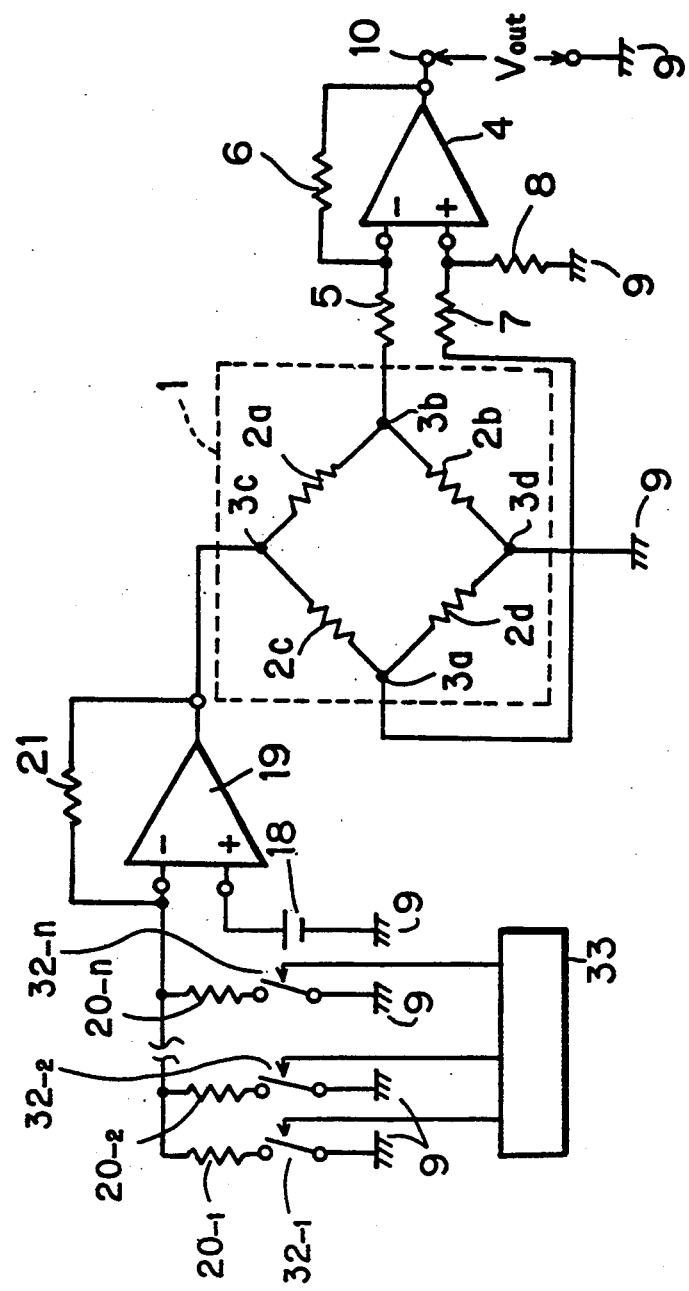
FIG. 4 is a circuit diagram showing a semiconductor device having a stress transducer according to a fourth embodiment of the present invention.

Then, a fourth preferred embodiment of the present invention will be described with reference to FIG. 4. FIG. 4 is a circuit diagram showing a semiconductor device having a stress transducer according to the fourth preferred embodiment. Referring to FIG. 4, digital switches $32_{-1}$ to $32_{-n}$ are connected in series between resistances $20_{-1}$ to $20_{-n}$ and Grounds. For example, the digital switches $32_{-1}$ to $32_{-n}$ are made of transistors and the like. Reference numeral 33 designates a non-volatile memory which stores digital data to turn on or off the digital switches $32_{-1}$ to $32_{-n}$. Other like reference numerals denote equivalent or corresponding parts to those of FIG. 2, and connections among them are also similar to FIG. 2. Although the operational amplifier 19 has its output adjusted by utilizing the fuzes $22_{-1}$ to $22_{-n}$ to brake them with laser or the like, or utilizing the zener diodes $23_{-1}$ to $23_{-n}$ to short-circuit them with current in the second and third preferred embodiments, a semiconductor device shown in FIG. 4 has its sensitivity adjusted by utilizing digital switches $32_{-1}$ to $32_{-n}$ to selectively turn on or off in accordance with variations in sensitivity of stress detectors 1 and thus varying a resistance value of a resistance network between an operational amplifier 19 and grounds to vary output voltage of the operation amplifier 19. Here, each of resistances $20_{-1}$ to $20_{-n}$ and each of the switches $32_{-1}$ to $32_{-n}$ connected in series to each other together function as a resistance value adjusting element.

Figure 5:
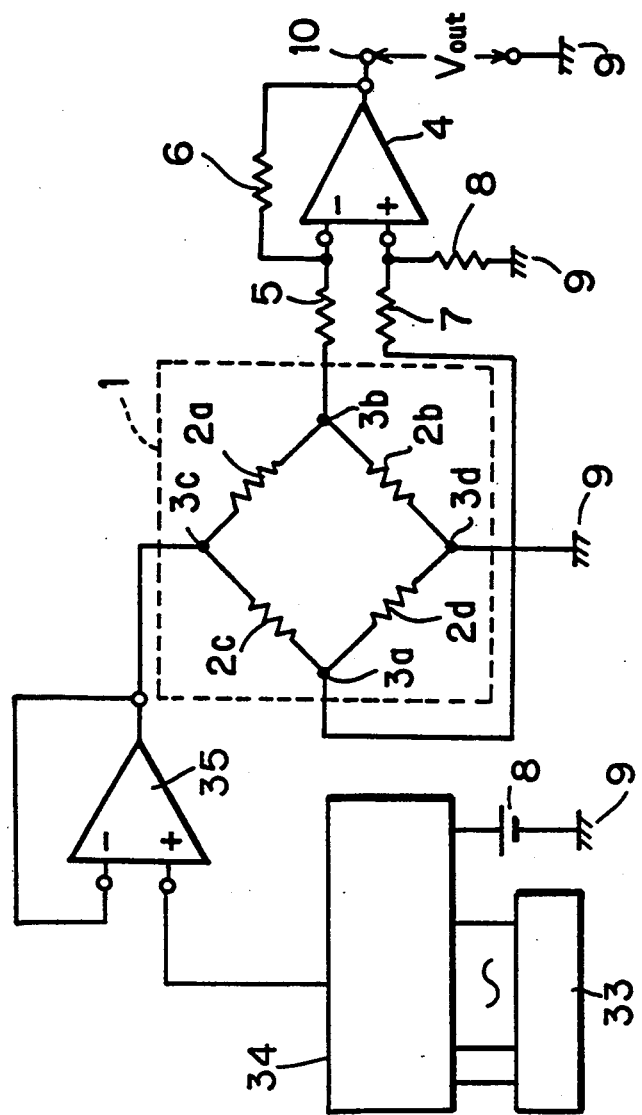
FIG. 5 is a circuit diagram showing a semiconductor device having a stress transducer according to a fifth embodiment of the present invention.

Now, a fifth preferred embodiment of the present invention will be described with reference to FIG. 5. FIG. 5 is a circuit diagram showing a semiconductor device having a stress transducer according to the fifth preferred embodiment according to the present invention. In FIG. 5, reference numeral 33 denotes a non-volatile memory which stores data on voltage to be applied to a node 3c, and numeral 34 denotes a digital-analog converter which converts voltage received at its reference voltage terminal with a multiplying factor according to data stored in the non-volatile memory 33 to output it. In FIG. 5, the D/A converter 34 is utilized, which has its reference voltage terminal connected to a reference voltage source 18. Digital data in accordance with variations in sensitivity of the stress detectors 1 is stored in the non-volatile memory 33, and voltage in accordance with reference voltage (i.e., voltage having the same temperature coefficient as that of the reference voltage) is developed at an output terminal of the D/A converter 34 in accordance with the data in the non-volatile memory 33. Then, for example, an operational amplifier 35 functions as a voltage follower to cause the resultant voltage to be current-amplified and applies the resultant voltage to a stress transducer 1, so that compensation of temperature dependency of the stress transducer 1 and correction of variations in sensitivity of several stress transducers 1 can be implemented.

Figure 6:
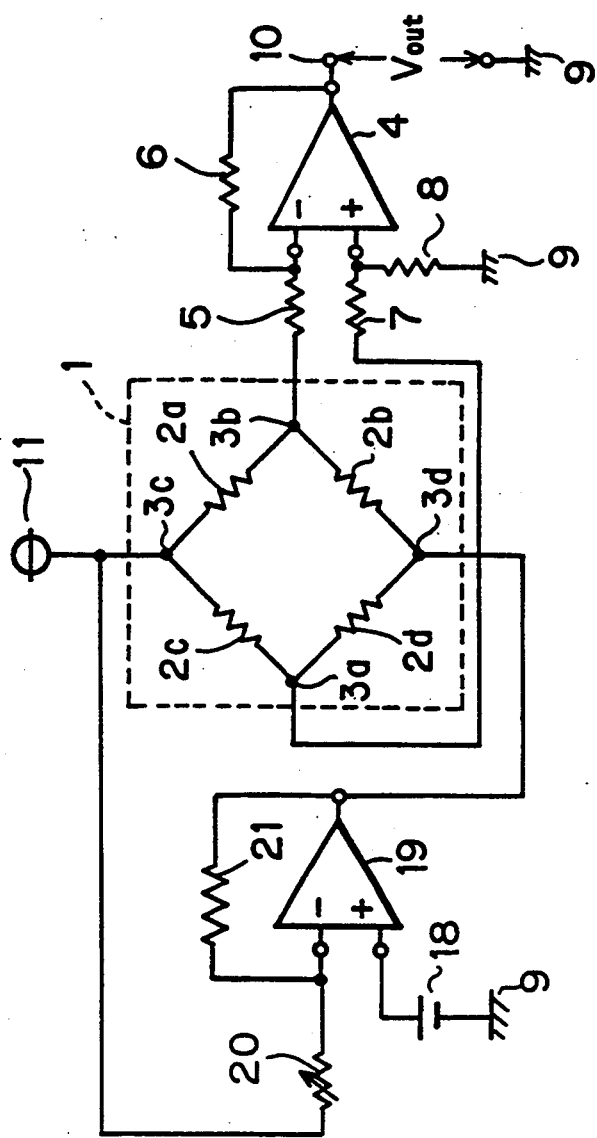
FIG. 6 is a circuit diagram showing a semiconductor device having a stress transducer according to a sixth embodiment of the present invention.

Now, a sixth preferred embodiment of the present invention will be described with reference to FIG. 6. FIG. 6 is a circuit diagram showing a semiconductor device having a stress transducer according to the sixth preferred embodiment of the present invention. In FIG. 6, the semiconductor device includes a stress detector 1 which has a bridge circuit consisting of strain gauge resistances $2a$, $2b$, $2c$ and $2d$, where $3c$ is a node between the strain gauge resistances $2a$ and $2c$, $3d$ is a node between the stain gauge resistances $2b$ and $2d$, $3a$ is a node between the strain gauge resistances $2c$ and $2d$, and $3b$ is a node between the strain gauge resistances $2a$ and $2b$. Voltage developed between the nodes $3a$ and $3b$ is in proportion to stress to be detected. The semiconductor device having a stress transducer also includes an operational amplifier 4 for amplifying output voltage $V_{span}$ (differential voltage between the nodes $3a$ and $3b$) at the stress detector 1, resistances 5, 6, 7 and 8 determining an amplification factor of the operational amplifier 4, and grounds 9 to which one end of the resistance 8 and the like are grounded. Reference numeral 10 denotes an output terminal of the operational amplifier 4, and numeral 11 denotes a power source for supplying voltage $V_{cc}$ to the node $3c$ of the stress detector 1. The differential voltage between the nodes $3a$ and $3b$ is single-ended by the operational amplifier 4 or the like, and further, the voltage $V_{span}$ is amplified to $(R_6/R_5)$ times so as to output output voltage $V_{out}$. The semiconductor device having a stress transducer further includes a reference voltage source 18 which develops reference voltage having a positive or negative temperature coefficient and which, for example, can be easily implemented by a band gap type reference voltage source, a zener diode, or the like. An operational amplifier 19 amplifies the reference voltage of the reference voltage source 18, and resistances 20 and 21 determine an amplification factor of the operational amplifier 19. The reference voltage source 18 has its negative electrode grounded and its positive electrode connected to a non-inversion amplification terminal of the operational amplifier 19. The resistance 20 has its first terminal connected to the power source 11 and its second terminal connected to an inversion input terminal of the operational amplifier 19. The resistance 21 has its first terminal connected to an output terminal of the operational amplifier 19 and its second terminal connected to the inversion input terminal of the operational amplifier 19 so as to negatively feed back voltage at the output terminal. The operational amplifier 19 has its output terminal connected to a node 3d so as to apply drive voltage $V_{19}$ to the bridge circuit consisting of the strain gauge resistances 2a, 2b, 2c and 2d. The bridge circuit is actuated by differential voltage between the supply voltage $V_{cc}$ and the drive voltage $V_{19}$. As to the circuit in FIG. 6, when voltage supplied by the power source 11 to the node 3c is higher than voltage output by the operational amplifier 19, or when potential $E_{3c}$ at the node 3c is higher than potential $E_{3d}$ at the node 3d, it is necessary that the reference voltage source 18 develops the reference voltage having a negative temperature coefficient. Reversely, when the potential $E_{3c}$ at the node 3c is lower than the potential $E_{3d}$ at the node 3d, it is necessary that the reference voltage source 18 develops the reference voltage having a positive temperature coefficient.

Then, an operation of the semiconductor device having a stress transducer according to the sixth preferred embodiment will be explained. When the reference voltage has a negative temperature coefficient, the following formula is given:

$$V_{ref}(T) = V_{ref0} \times (1 - \gamma \cdot T) \quad (22)$$

where $V_{ref}(T)$ is voltage of the reference voltage source 18.

$V_{ref}(T)$ is amplified by the operational amplifier 19, and the output voltage $V_{19}$ of the operational amplifier can be expressed as follows:

$$V_{19} = V_{ref}(T) - (V_{cc} - V_{ref}(T)) \times \frac{R_{21}}{R_{20}} = \quad (23)$$

$$\left(1 - \frac{R_{21}}{R_{20}}\right) \times V_{ref}(T) - \frac{R_{21}}{R_{20}} \times V_{cc}$$

where $R_{20}$ and $R_{21}$ are resistance values of the resistances 20 and 21, and $V_{cc}$ is voltage applied by the power source 11 to the node 3c.

The potential $E_{3d}$ at the node 3d is $(V_{19}+0)$. The output voltage $V_{span}$ at the bridge circuit of the stress detector 1 can be given by the formula (9). Also, in FIG. 6, since the node 3c is connected to the power source 11, the potential $E_{3c}$ at the node 3c is $(V_{cc}+0)$. A configuration of the bridge circuit 2a to 2d is similar to the prior art. Hence, substituting the formula (23) for the formula (9) leads the following formula:

$$V_{span}(T) = a \cdot Fx \frac{\pi_0}{1 + \alpha \cdot T} \times \left\{ \left(1 - \frac{R_{21}}{R_{20}}\right) \times \right. \quad (24)$$

$$V_{cc} - \left(1 - \frac{R_{21}}{R_{20}}\right) \times V_{ref}(T) \Bigg\} =$$

$$a \cdot F \cdot \pi_0 \times \left(1 - \frac{R_{21}}{R_{20}}\right) \times \frac{V_{cc} - V_{ref}(T)}{1 + \alpha \cdot T}$$

Additionally, the formulas (22) and (24) lead to the following formula:

$$V_{span}(T) = a \cdot F \cdot \pi_0 \times \left(1 - \frac{R_{21}}{R_{20}}\right) \times \quad (25)$$

$$(V_{cc} - V_{ref0}) \times \frac{1 + \frac{V_{ref0}}{V_{cc} - V_{ref0}} \times \gamma \cdot T}{1 + \alpha \cdot T}$$

Thus, it can be found from the formula (25) that the relation between a temperature coefficient $\alpha$ of a piezo resistance coefficient and a temperature coefficient $\gamma$ of the reference voltage is given by the following formula:

$$\gamma = \left(\frac{V_{cc}}{V_{ref0}} - 1\right) \times \alpha \quad (26)$$

Thus, it can also be found that setting the temperature coefficient $\gamma$ of the reference voltage of the reference voltage source 18 so as to satisfy the relation of the formula (26), temperature dependency of sensitivity of the stress detector 1 can be compensated in the formula (25). Moreover, variations in sensitivity of several stress detectors 1 (variations of $a \cdot \pi_0$) can be corrected by adjusting a resistance value at the resistance 20.

The resistances 20 and 21 usually take resistance values with temperature coefficients, and if temperature coefficients are the same, they cancel to each other and exert no influence. For example, the resistances 20 and 21 may be formed of thin film resistances of NiCr or the like having an identical temperature coefficient, and can be formed on a single semiconductor chip together with the stress detector 1, the operational amplifiers 4 and 19, the reference voltage source 18, and the resistances 5, 6, 7 and 8 (which are formed, in this case, by impurity diffusion). Adjustment of the resistance 20 can be performed by trimming with laser or the like.

The foregoing is the case where the reference voltage has a negative temperature coefficient in the sixth preferred embodiment, but even if the reference voltage has a positive temperature coefficient, the temperature coefficient $\alpha$ of the piezo resistance coefficient can be compensated.

Figure 7:
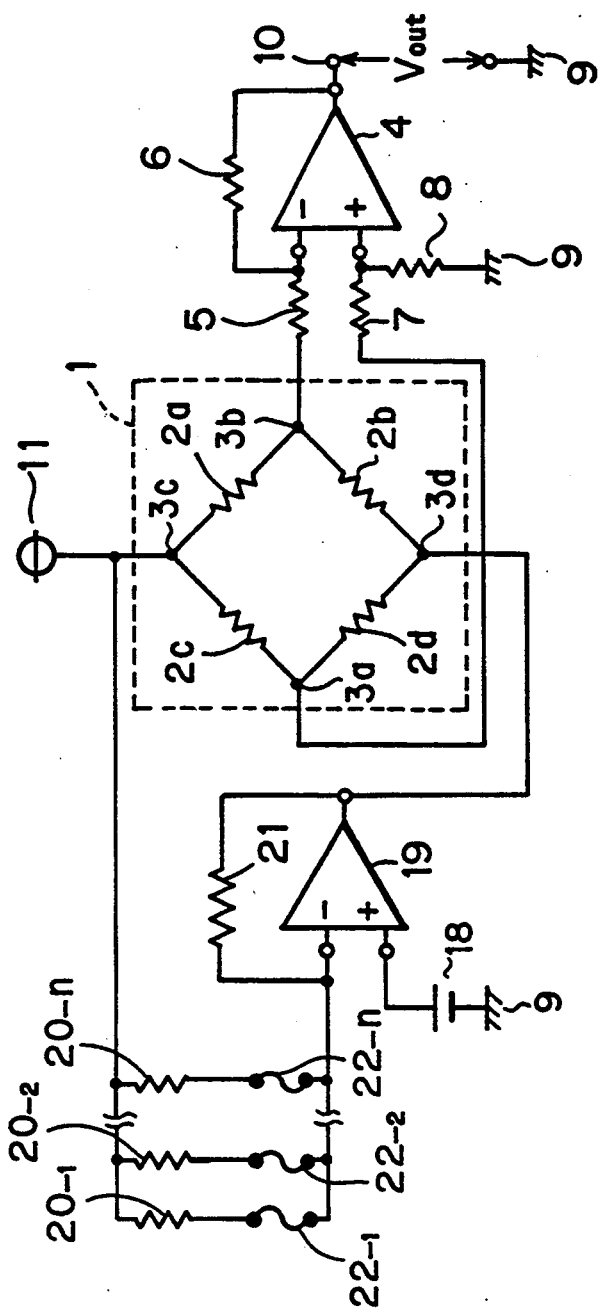
FIG. 7 is a circuit diagram showing a semiconductor device having a stress transducer which is a combination of the second embodiment with the sixth embodiment of the present invention.
Figure 8:
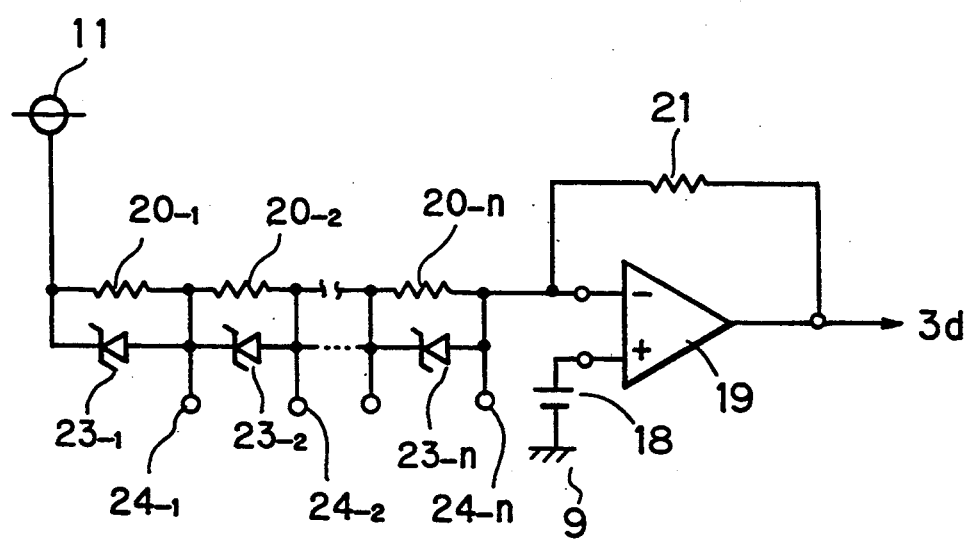
FIG. 8 is a circuit diagram showing a semiconductor device having a stress transducer which is a combination of the third embodiment with the sixth embodiment of the present invention.
Figure 9:
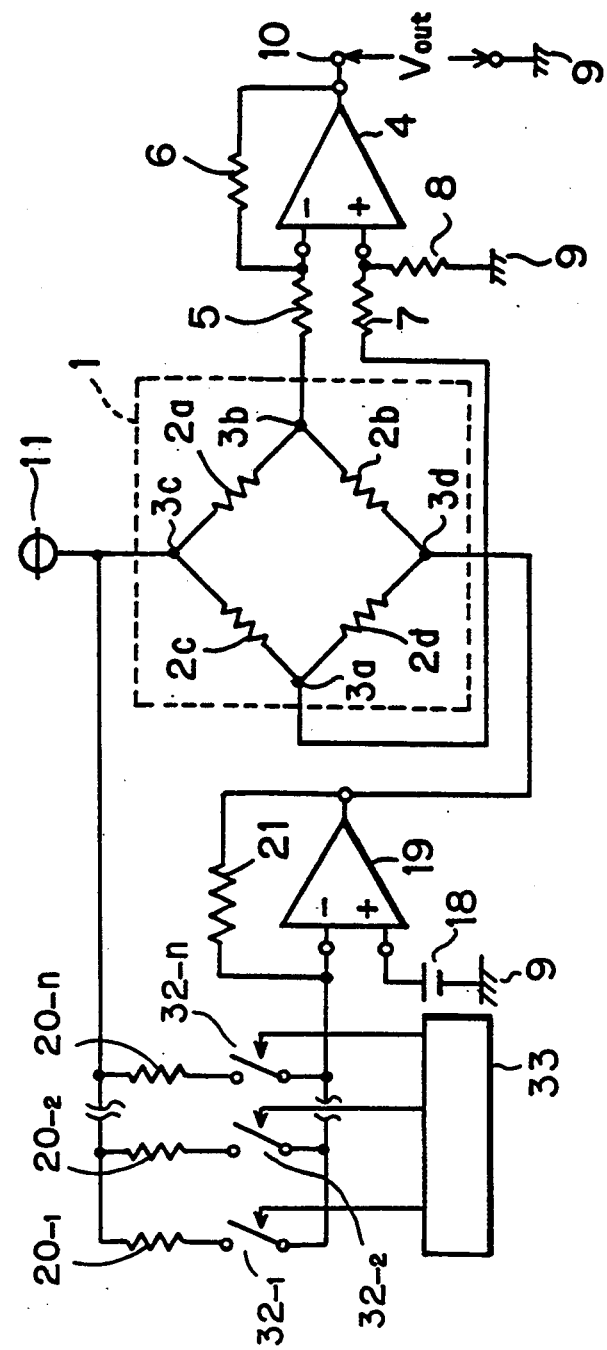
FIG. 9 is a circuit diagram showing a semiconductor device having a stress transducer which is a combination of the fourth embodiment with the sixth embodiment of the present invention.

The resistance value adjusting element in the second, third and fourth preferred embodiments may be used for implementing the resistance 20 in the sixth preferred embodiment, and FIGS. 7 to 9 show various combinations. Various effects in semiconductor devices having a stress transducer shown in FIGS. 7 to 9 according to the present invention are similar to the previous embodiments.

Figure 10:
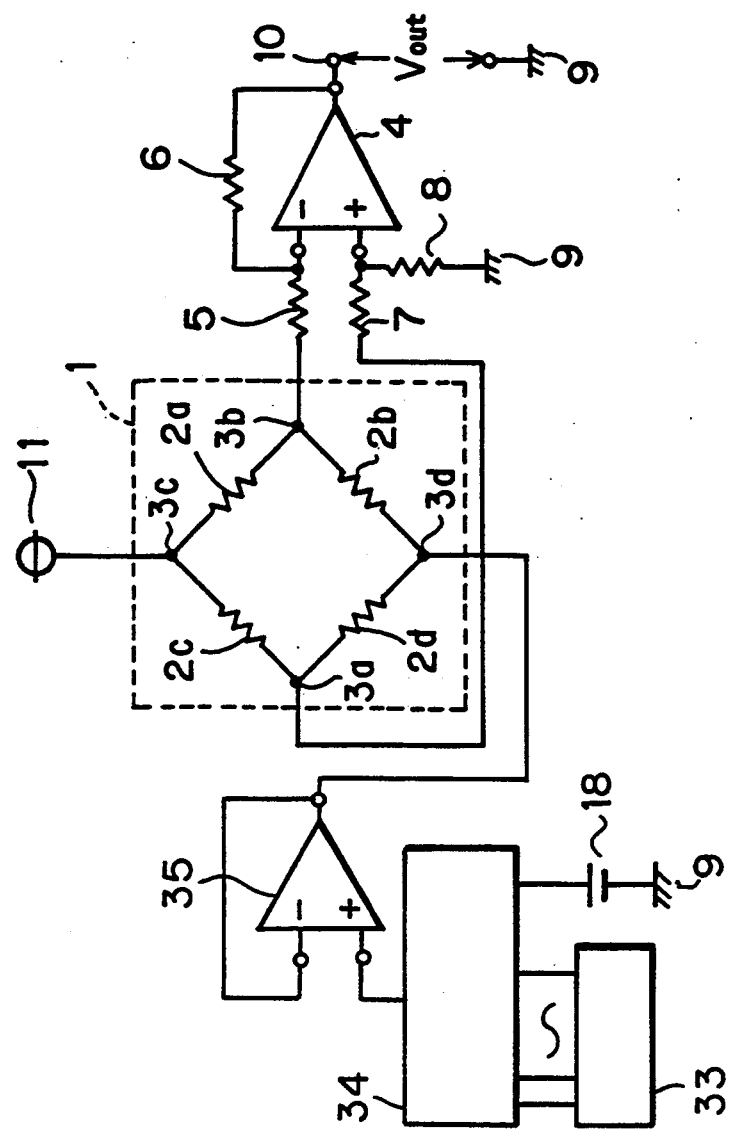
FIG. 10 is a circuit diagram showing a semiconductor device having a stress transducer according to a seventh embodiment of the present invention.

Then, a seventh preferred embodiment will be described with reference to FIG. 10. FIG. 10 is a circuit diagram showing a semiconductor device having a stress transducer according to a seventh preferred embodiment of the present invention. Referring to FIG. 10, the semiconductor device includes a power source 11 for supplying voltage $V_{cc}$ to a node 3c, a non-volatile memory 33 which stores data on voltage to be applied to a node 3d, and a digital-analog converter 34 for converting voltage received at its reference voltage terminal with a multiplying factor according to data stored in the non-volatile memory 33. In FIG. 10, the D/A converter 34 is utilized, having its reference voltage terminal connected to a reference voltage source 18, and digital data in accordance with variation in sensitivity of stress detector 1 is stored in the non-volatile memory 33, so that the D/A converter 34 develops voltage in accordance with reference voltage at its output terminal based upon the data in the non-volatile memory 33 (i.e., voltage having the same temperature coefficient as that of the reference voltage). Then, for example, an operational amplifier 35 functions as voltage follower to current-amplify the resultant voltage and applies voltage to the stress transducer, so that compensation of the temperature dependency of the stress transducer 1 and correction of variations in sensitivity of several stress transducers 1 can be implemented. In the circuit shown in FIG. 10, when voltage supplied by the power source 11 to the node 3c is higher than voltage output by the operational amplifier 35, or when potential $E_{3c}$ at the node 3c is higher than potential $E_{3d}$ at the node 3d, the reference voltage source 18 develops reference voltage having a negative temperature coefficient. Reversely, the potential $E_{3c}$ at the node 3c is lower than the potential $E_{3d}$ at the node 3d, the reference voltage source 18 develops the reference voltage having a positive temperature coefficient.

Figure 11:
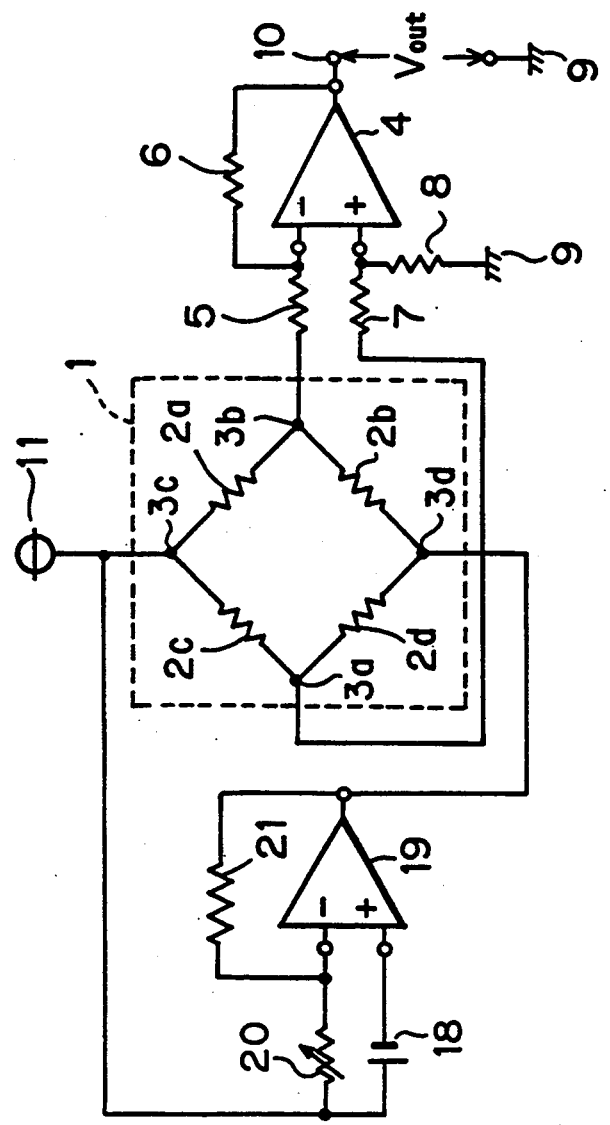
FIG. 11 is a circuit diagram showing a semiconductor device having a stress transducer according to a eighth embodiment of the present invention.

Now, an eighth preferred embodiment of the present invention will be described with reference to FIG. 11. FIG. 11 is a circuit diagram showing a semiconductor device having a stress transducer according to the eighth preferred embodiment of the present invention. In FIG. 11, like reference numerals denote identical or corresponding parts to those of FIG. 6. FIG. 11 is different from FIG. 6 in that a reference voltage source 18 has its positive electrode connected to a power source 11 and its negative electrode connected to a non-inversion input terminal of an operational amplifier 19. In the circuit shown in FIG. 11, it is necessary that the reference voltage source 18 develops reference voltage having a positive temperature coefficient.

Then, an operation of the semiconductor device having a stress transducer of the eighth preferred embodiment will be described. Assuming that voltage of the reference voltage source 18 is $V_{ref}(T)$, the formula (19) is given.

$V_{ref}(T)$ is amplified by the operational amplifier 19, and with an assumption that resistances 20 and 21 has resistance values $R_{20}$ and $R_{21}$, and voltage $V_{cc}$ is applied by the power source 11 to a node 3c, output voltage $V_{19}$ of the operational amplifier 19 can be expressed as in the following formula:

$$V_{19} = V_{cc} - \left(1 + \frac{R_{21}}{R_{20}}\right) \times V_{ref}(T) \quad (27)$$

Here, potential $E_{3d}$ at a node 3d is $(V_{19}+0)$. Output voltage $V_{span}$ of the bridge circuit of the stress detector 1 can be given by the formula (9). Also, a node 3c is connected to the power source 11 in FIG. 11, potential $E_{3c}$ at the node 3c is $(V_{cc}+0)$. A configuration of the bridge circuit 2a to 2d is similar to the prior art. Thus, substituting the formula (27) for the formula (9), the following formula is give:

$$V_{span}(T) = a \cdot F \times \frac{\pi_0}{1 + \alpha \cdot T} \times \left(1 + \frac{R_{21}}{R_{20}}\right) \times V_{ref}(T) \quad (28)$$

Furthermore, the formulas (19) and (28) lead the following formula:

$$V_{span}(T) = a \cdot F \cdot \pi_0 \times \left(1 + \frac{R_{21}}{R_{20}}\right) \times V_{ref}0 \times \frac{1 + \gamma \cdot T}{1 + \alpha \cdot T} \quad (29)$$

Thus, it can be found that setting a temperature coefficient of the reference voltage source 18 in accordance with the formula (29) so that the relation between a temperature coefficient $\alpha$ of a piezo resistance coefficient and a temperature coefficient $\gamma$ of reference voltage satisfy the relation $\alpha=\gamma$, temperature dependency of sensitivity of the stress detector 1 can be compensated. Also, variations in sensitivity of several stress detectors 1 (variations of $a \cdot \pi_0$) can be corrected by adjusting a resistance value of a resistance 20. Resistances 20 and 21 usually have their resistance values with temperature coefficients, but since they cancel with each other if identical in temperature coefficient, they exert no influence of the temperature coefficient. For example, the resistances 21 and 20 may be formed of thin film resistances of NiCr or the like having an identical temperature coefficient, and can be formed on a single semiconductor chip together with the stress detector 1, operational amplifiers 4 and 19, reference voltage source 18, and resistances 5, 6, 7 and 8 (which are formed, in this case, by impurity diffusion). Adjustment of the resistance 20 can be performed by trimming with laser or the like.

The resistance value adjusting element in the second, third and fourth preferred embodiments may be used for implementing the resistance 20 in the eighth preferred embodiment. Various effects in semiconductor devices having a stress transducer brought about by combinations of the second to fourth preferred embodiments with the eighth preferred embodiment are similar to the above embodiments.

Figure 12:
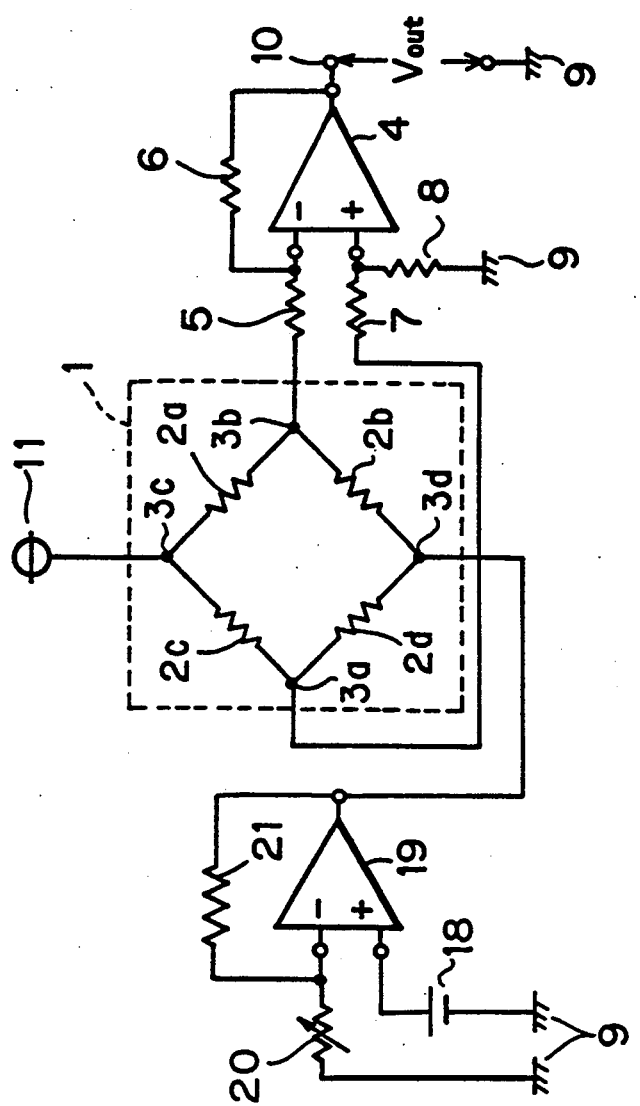
FIG. 12 is a circuit diagram showing a semiconductor device having a stress transducer according to a ninth embodiment of the present invention.

Then, a ninth preferred embodiment of the present invention will be described with reference to FIG. 12. FIG. 12 is a circuit diagram showing a semiconductor device having a stress transducer according to the ninth preferred embodiment of the present invention. Referring to FIG. 12, like reference numerals denote identical or corresponding parts to those of FIG. 6. FIG. 12 is different from FIG. 6 in that a resistance 20 has its first terminal grounded and its second terminal connected to an inversion input terminal of an operational amplifier 19. In the circuit of FIG. 12, when voltage supplied by a power source 11 to a node 3c is higher than voltage output by the operational amplifier 19, or when potential $E_{3c}$ at the node 3c is higher than potential $E_{3d}$ at a node 3d, it is necessary that a reference voltage source 18 develops reference voltage having a negative temperature coefficient. Reversely, when the potential $E_{3c}$ at the node $3c$ is lower than the potential $E_{3d}$ at the node $3d$, it is necessary that the reference voltage source 18 develops the reference voltage having a positive temperature coefficient.

Now, a specific circuit configuration of the reference voltage sources in the above-mentioned preferred embodiments will be described. Those reference voltage sources have a positive or negative temperature coefficient due to the circuit configurations of the respective semiconductor devices having a stress transducer, and therefore, both the reference voltage source having a positive temperature coefficient and the reference voltage source having a negative temperature coefficient are required. FIG. 13 is a circuit diagram showing a reference voltage source having a positive temperature coefficient where an avalanche diode is used. In FIG. 13, the reference voltage source includes a power source 11, grounds 9, avalanche diodes 41, diodes 42, a resistance 43, and output terminals 44 and 45. FIG. 13(a) shows a reference voltage source which consists of the plurality of avalanche diodes 41 connected in series in a reverse direction, one of which having its anode grounded, the plurality of diodes 42 connected in series in a forward direction, one of which having its cathode connected to a cathode of one of the avalanche diodes 41, and a resistance 43 having its first terminal connected to the power source 11 and its second terminal connected to an anode of one of the diodes 42. The avalanche diodes 41 develop constant voltage having a positive temperature coefficient. The reference voltage source can be formed of a single avalanche diode 41 alone, however one avalanche diode alone is not enough to obtain a sufficiently large positive temperature coefficient depending upon an impurity concentration and the like of the avalanche diode. However, the sum of the temperature coefficinets of the avalanche diodes 41 connected in series is the temperature coefficient of the reference voltage. Thus, many avalanche diodes 41 are employed to gain a large positive temperature coefficient. The plurality of avalanche diodes 41 are useful because the temperature coefficient can be adjusted by varying the number of the connected ones. Moreover, forward voltage drop of a diode exhibit a negative temperature coefficient, and therefore, the diodes 42 having negative temperature coefficients different in absolute value from positive temperature coefficients which the avalanche diodes 41 have are connected in series to the avalanche diodes 41 in the forward direction, so that a minute temperature coefficient can be adjusted. Then, as reference voltage, a potential difference between the ground 9 and the output terminal 44 connected to a second terminal of the resistance 43 is employed. A reference voltage source is, for example, useful for the reference voltage source 18 shown in FIGS. 1 through 5 in the above preferred embodiments. The sum of the temperature coefficients of the avalanche diodes 41, in this case, is larger than the sum of the temperature coefficients of the diodes 42.

FIG. 13(b) shows a reference voltage source which consists of the resistance 43 having its first terminal grounded, the plurality of the avalanche diodes 41 connected in series in the reverse direction, one of which has its anode connected to a second terminal of the resistance 43, and the plurality of the diodes 42 connected in series in the forward direction, one of which has its cathode connected to a cathode of one of the avalanche diodes 41 and another of which has its one end connected to the power source 11. This reference voltage source is different from that of FIG. 13(a) in that a potential difference between the power source 11 and an output terminal 45 connected to the second terminal of the resistance 43 is employed. The reference voltage source is used, for example, for the reference voltage source 18 shown in FIG. 11 in the above embodiment.

Figure 14:
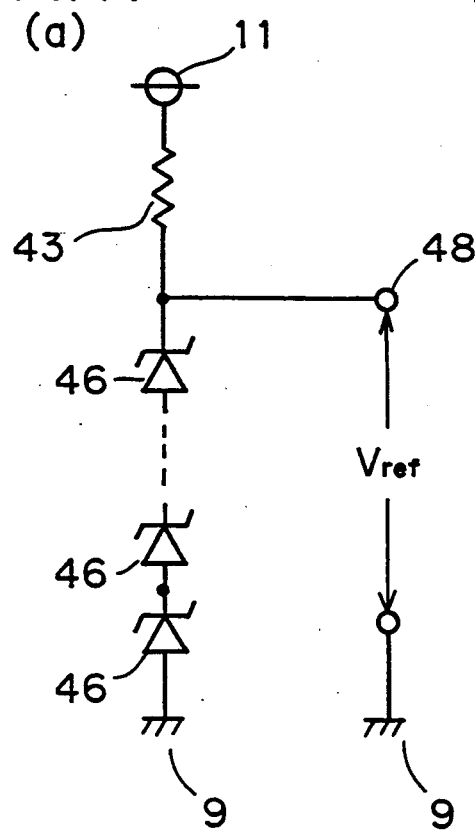
FIG. 14 is a circuit diagram showing a reference voltage source which utilizes a Zener diode or a diode, according to the present invention.
Figure 14:
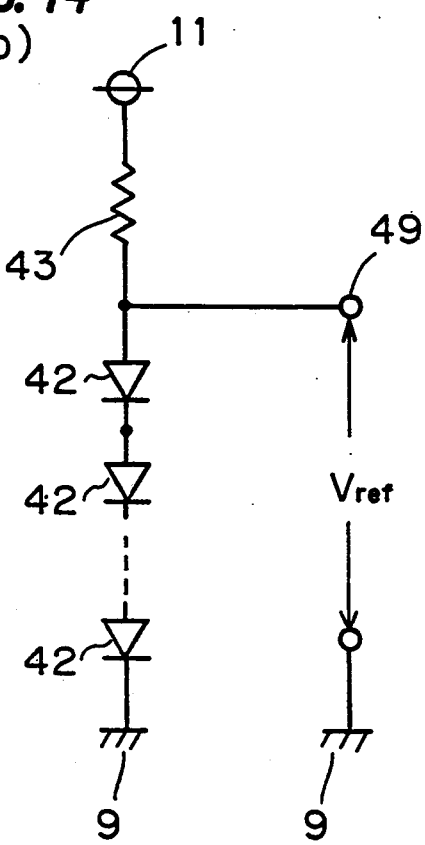

FIG. 14 is a circuit diagram showing a reference voltage source having a negative temperature coefficient, where forward voltage drop of a zener diode or diode is utilized. In FIG. 14, the reference voltage source includes a power source 11, grounds 9, diodes 42, a resistance 43, zener diodes 46, and output terminals 48 and 49. FIG. 14(a) shows a reference voltage source which consists of the plurality of the zener diodes 46 connected in series in the reverse direction one of which has its anode grounded, and the resistance 43 having its first terminal connected to the power source 11 and its second terminal connected to a cathode of one of the zener diodes 46. The zener diodes 46 develop constant voltages having negative temperature coefficients. The reference voltage source can consist of only one zener diode 46, but such a single zener diode cannot make so large a negative temperature coefficient because a temperature coefficient which the zener diode has is determined depending upon an impurity concentration and the like. However, the sum of the temperature coefficients of the zener diodes 46 connected in series is the temperature coefficient of the reference voltage. Thus, the plurality of the zener diodes 46 are used to gain a large negative temperature coefficient. Additionally, the plurality of the zener diodes 46 are useful because their temperature coefficients can be adjusted by varying the number of the connected ones. A potential difference between the ground 9 and the output terminal 48 connected to a second terminal of the resistance 43 is used as the reference voltage.

FIG. 14(b) is a circuit diagram showing a reference voltage source which consists of the plurality of the diodes 42 connected in series between the power source 11 and the ground 9, one of which has its cathode grounded, and the resistance 43 having its first terminal connected to the power source 11 and its second terminal connected to an anode of one of the diodes 42. The diodes 42 are connected in the forward direction to cause forward voltage drop. Since the forward voltage drop has a negative temperature coefficient, the reference voltage source can be formed of only one diode 42, but such a single diode cannot make so large a negative temperature coefficient. However, the sum of the temperature coefficients of the diodes 42 connected in series is a temperature coefficient of the reference voltage. Then, the plurality of the diodes 42 connected in series are employed to gain a large negative temperature coefficient. Also, the plurality of the diodes 42 are useful for adjusting the temperature coefficient by varying the number of the connected ones. As to the reference voltage, a potential difference between the ground 9 and the output terminal 49 connected to the second terminal of the resistance 43 is employed. The reference voltage sources shown in FIGS. 14(a) and 14(b) are used in the above embodiments in the case where a negative temperature coefficient is required; for example, they are used as the reference voltage sources 18 in the circuits shown in FIGS. 6 through 10.

Figure 15:
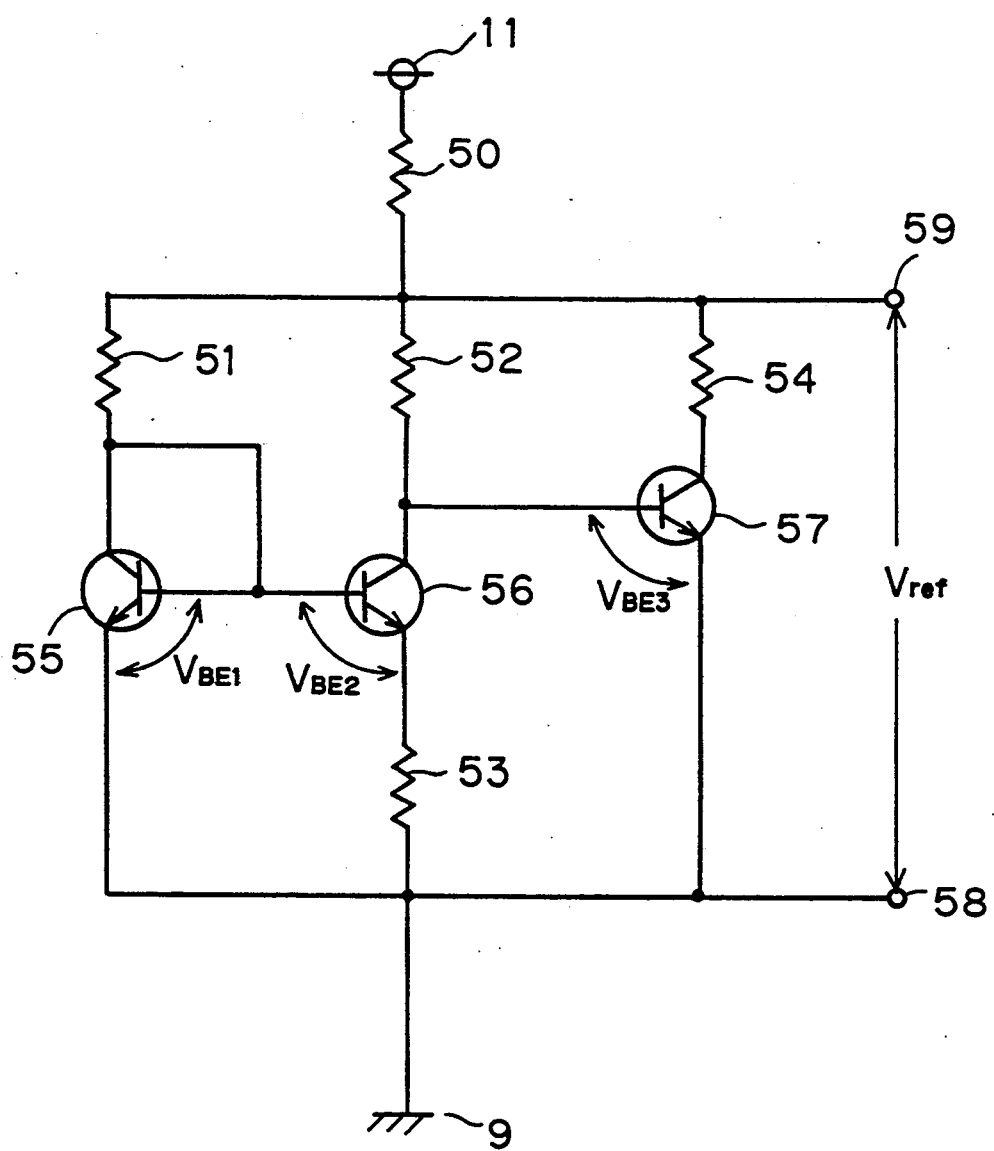
FIG. 15 is a circuit diagram showing a band gap reference voltage source according to the present invention.
Figure 16:
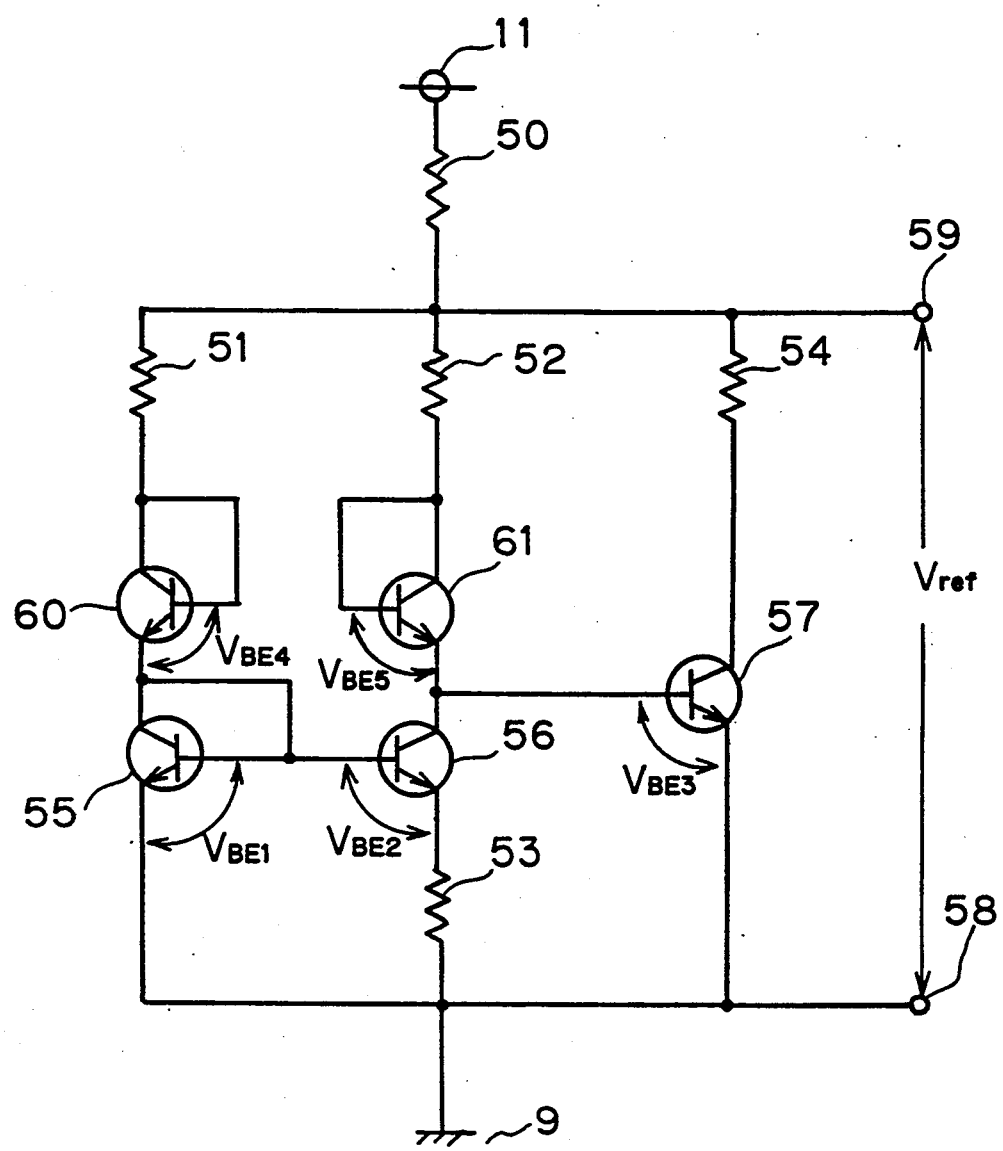
FIG. 16 is a circuit diagram showing a band gap reference voltage source according to the present invention.

Then, a band gap type reference voltage source will be described with reference to FIGS. 15 to 17. A band gap reference voltage source shown in FIG. 15 is a reference voltage source which develops voltage based upon a potential at a ground. In FIG. 15, a circuit includes resistances 50 to 54, npn bipolar transistors 55 to 57, and output terminals 58 and 59. The resistance 50 has its first terminal connected to a power source 11 and its second terminal connected to first terminals of the resistances 51, 52 and 54. A current source consists of the power source 11 and the resistance 50. The resistance 51 has its second terminal connected to a collector and a base of the transistor 55, and the transistor 55 has its emitter grounded. The resistance 52 has its second terminal connected to a collector of the transistor 56, and the transistor 56 has its base connected to a base of the transistor 55 and its emitter connected to a first terminal of the resistance 53. A second terminal of the resistance 53 is grounded. The transistor 57 has its collector connected to a second terminal of the resistance 54, its base connected to a collector of the transistor 56, and its emitter grounded. Reference voltage is a potential difference between the output terminal 59 connected to a first terminal of the resistance 54 and the output terminal 58 grounded.

Then, an operation of this reference voltage source will be described. Base-emitter voltages at the transistors 56 to 58 are denoted by $V_{BE1}$ to $V_{BE3}$, and resistance values of the resistances 51 to 54 are denoted by $R_{51}$ to $R_{54}$. $I_2$ is a current flowing in the resistor 53. The transistors 55 and 56 have their respective bases commonly connected, and this leads the following formula:

$$V_{BE1} = V_{BE2} + I_2 R_{53} \tag{30}$$

Assuming that voltage between the output terminals 58 and 59 is $V_{ref}$ and current flowing in the resistance 51 is $I_1$ while current flowing in the resistance 52 is $I_2$, the following two formulas are led from voltage drop at the resistance 51 and the base-emitter voltage $V_{BE1}$ of the transistor 55 and from voltage drop at the resistance 52 and the base-emitter voltage $V_{BE3}$ of the transistor 57:

$$V_{ref} = V_{BE1} + I_1 \cdot R_{51} \tag{31}$$

$$V_{ref} = V_{BE3} + I_2 \cdot R_{52} \tag{32}$$

Now, setting the relation between the base-emitter voltages $V_{BE1}$ and $V_{BE3}$ at the transistors 55 and 57 as $V_{BE1} = V_{BE3}$, the relations of the formulas (31) and (32) are used to lead the following formula:

$$\frac{I_1}{I_2} = \frac{R_{52}}{R_{51}} \tag{33}$$

Generally, base-emitter voltage of a transistor can be given by the following formula:

$$V_{BE} = \frac{k \cdot T}{q} \times \ln \frac{I_E}{I_S} \tag{34}$$

where k is a Boltzmann constant, T is an absolute temperature, q is an electric charge of electrons, $I_S$ is a saturation current of the transistor, and $I_E$ is emitter current of the transistor.

Thus, assuming that saturation current of the transistor 55 is $I_{S1}$ while saturation current of the transistor 56 is $I_{S2}$, the base-emitter voltages $V_{BE1}$ and $V_{BE2}$ at the transistors 55 and 56 can be given by the following formulas:

$$V_{BE1} = \frac{k \cdot T}{q} \times \ln \frac{I_1}{I_{S1}} \tag{35}$$

$$V_{BE2} = \frac{k \cdot T}{q} \times \ln \frac{I_2}{I_{S2}} \tag{36}$$

The formulas (35) and (36) and the formula (30) lead the following formula:

$$I_2 \cdot R_{53} = \frac{k \cdot T}{q} \times \ln \left( \frac{I_1}{I_2} \times \frac{I_{S2}}{I_{S1}} \right) \tag{37}$$

Since the saturation current $I_S$ of the transistor is in proportion to an area of an emitter of the transistor, and assuming now that the emitter areas ratio of the transistor 55 to the transistor 56 is 1:n, the relation $I_{S1}/I_{S2}=n$ is shown, and this relation together with the formula (37) leads the following formula:

$$I_2 \cdot R_{53} = \frac{k \cdot T}{q} \times \ln \left( n \times \frac{I_1}{I_2} \right) \tag{38}$$

Furthermore, the formulas (33) and (38) lead the following formula:

$$I_2 \cdot R_{53} = \frac{k \cdot T}{q} \times \ln \left( n \times \frac{R_{52}}{R_{51}} \right) \tag{39}$$

The formula (39) is substituted for the formula (32):

$$V_{ref} = V_{BE3} + \frac{R_{52}}{R_{53}} \times \frac{k \cdot T}{q} \times \ln \left( n \times \frac{R_{52}}{R_{51}} \right) \tag{40}$$

Generally, $V_{BE}$ has a temperature coefficient $-2$ mV/° C. Also, the second term in the equation (40) is in proportion to the absolute temperature T. Accordingly, specifying the emitter areas ratio of the transistor 55 to the transistor 56 and the resistance values $R_{51}$ to $R_{53}$ of the resistances 51 to 53, which coefficient, positive or negative, the temperature coefficient of the refence voltage $V_{ref}$ exhibits and what value it takes can be freely specified.

In the circuit shown in FIG. 15, however, a value of the temperature coefficient of the reference voltage cannot be made smaller than $-2$ mV/° C. Then, as shown in FIG. 16, for example, connecting transistors 60 and 61 thereto, the negative temperature coefficient can be made larger. In FIG. 16, numerals 60 and 61 denote npn transistors. The transistor 60 is connected between the transistor 55 and the resistance 51 and has its collector and base connected to a second terminal of the resistance 51 and its emitter connected to a collector of the transistor 55. The transistor 61 is connected between the transistor 56 and the resistance 52, and has its collector and base connected to a second terminal of the resistance 52 and its emitter connected to a collector of the transistor 56. Like reference numerals in FIG. 16 denote equivalent or corresponding parts to those of FIG. 15, and other connections are also similar to the circuit in FIG. 15.

Base-emitter voltages of the transistors 60 and 61 are denoted by $V_{BE4}$ and $V_{BE5}$, respectively. Here, since bases of the transistors 55 and 56 are commonly connected, the formula (30) is shown.

Then, voltage drop of the resistance 51, the base-emitter voltage $V_{BE1}$ of the transistor 55, and the base-emitter voltage $V_{BE4}$ of the transistor 60 together lead the following formula:

$$V_{ref} = V_{BE1} + V_{BE4} + I_1 \cdot R_{51} \tag{41}$$

Also, voltage drop of the resistance 52, the base-emitter voltage $V_{BE3}$ of the transistor 57 and the base-emitter voltage $V_{BE5}$ of the transistor 61 together lead the following formula:

$$V_{ref} = V_{BE3} + V_{BE5} + I_2 \cdot R_{52} \tag{42}$$

Now, setting the relations among the base-emitter voltages $V_{BE1}$, $V_{BE3}$, $V_{BE4}$, and $V_{BE5}$ of the transistors 55, 57, 60 and 61 so as to satisfy the following formula, the relations of the formulas (41) and (42) together show the relation of the following formula:

$$V_{BE1} + V_{BE4} = V_{BE3} + V_{BE5} \tag{43}$$

Generally, since the base-emitter voltage $V_{BE}$ of the transistor is given by the formula (34), the base-emitter voltages $V_{BE1}$ and $V_{BE2}$ of the transistors 55 and 56 can be given by the formulas (35) and (36), assuming that the saturation current of the transistor 55 is $I_{S1}$ while the saturation current of the transistor 56 is $I_{S2}$. The formulas (35) and (36) and the formula (30) together lead the formula (37).

The saturation current $I_S$ of the transistor is in proportion to an emitter area of the transistor, and therefore, assuming that an emitter areas ratio of the transistor 55 to the transistor 56 is 1:n, the relation of $I_{S1}/I_{S2}=n$ is shown, and this relation together with the formula (37) lead the formula (38). Moreover, the formulas (33) and (38) lead the formula (39). Furthermore, substituting the formula (39) for the formula (42), the following formula is led:

$$V_{ref} = V_{BE2} + V_{BE5} + \frac{R_{52}}{R_{53}} \times \frac{k \cdot T}{q} \times \ln\left(n \times \frac{R_{52}}{R_{53}}\right) \tag{44}$$

The base-emitter voltages of the transistors 57 and 61 expressed by first and second terms in the formula (44) cause the reference voltage $V_{ref}$ to have a negative temperature coefficient, and a value of the temperature coefficient is never to be smaller than $-4$ mV/° C. Further, it can be found that comparing the formula (40) with the formula (44), the circuit in FIG. 16 succeeds in making an absolute value of the negative temperature coefficient larger than the circuit in FIG. 15.

Figure 17:
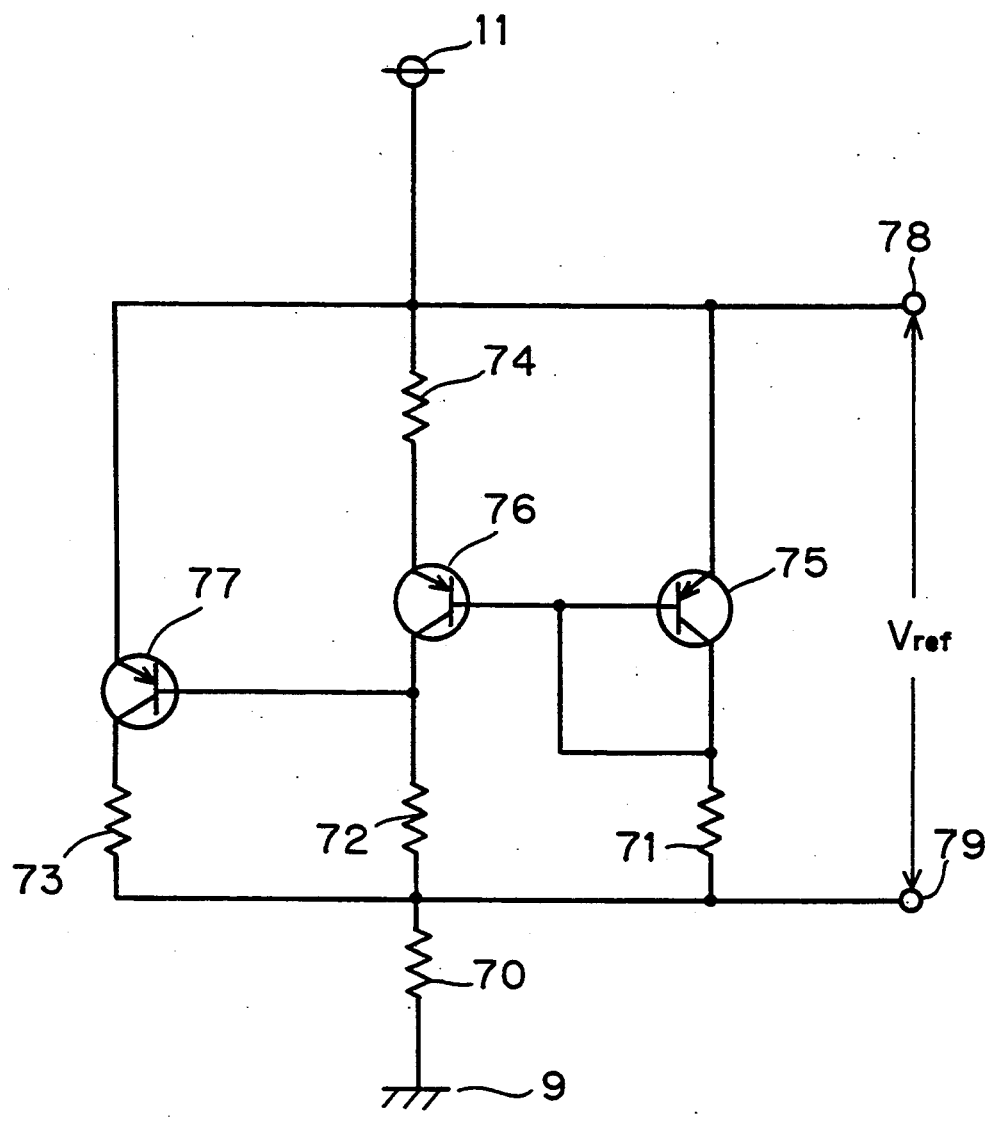
FIG. 17 is a circuit diagram showing a band gap reference voltage source according to the present invention.
Figure 18:
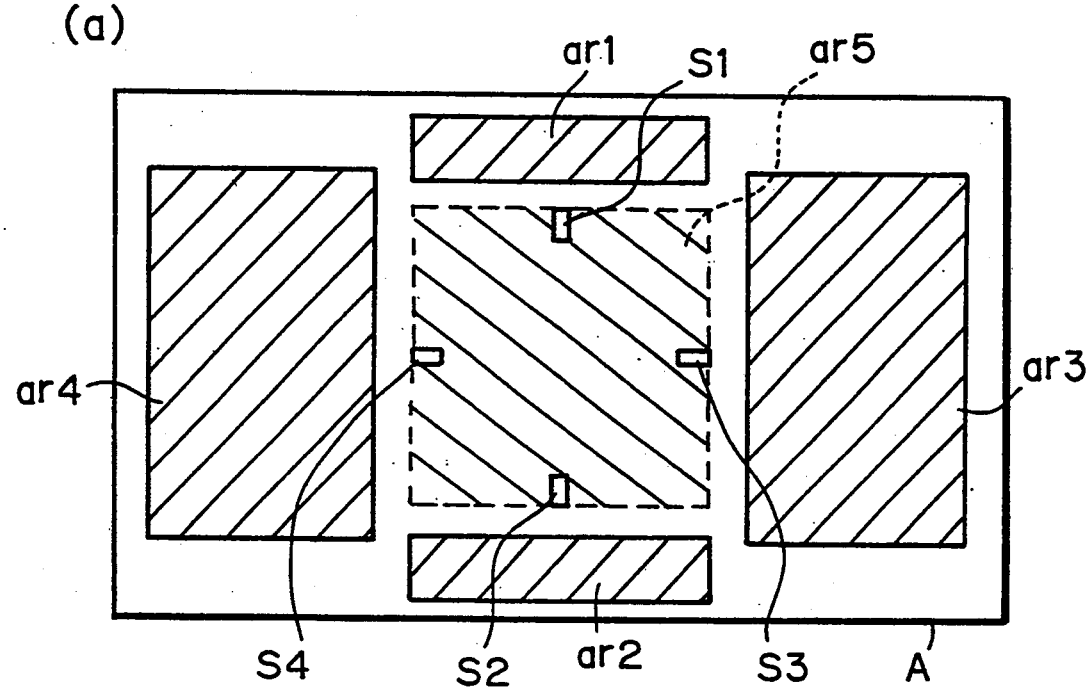
FIG. 18 is a plan view and a side view showing a pressure sensor as an example of a conventional semiconductor device having a stress transducer.
Figure 18:
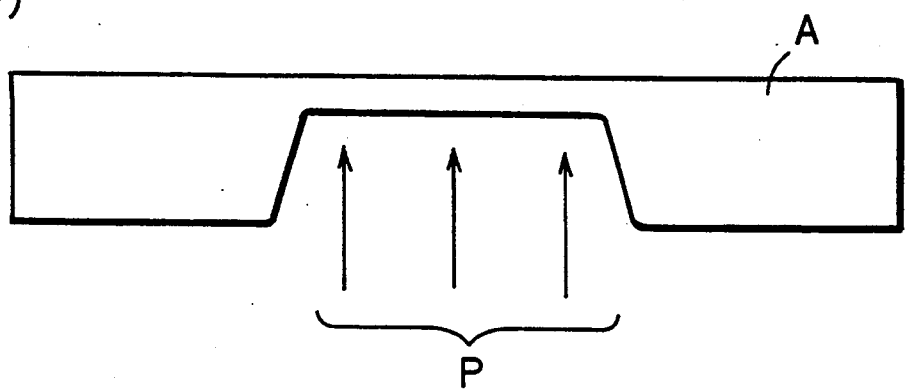
Figure 19:
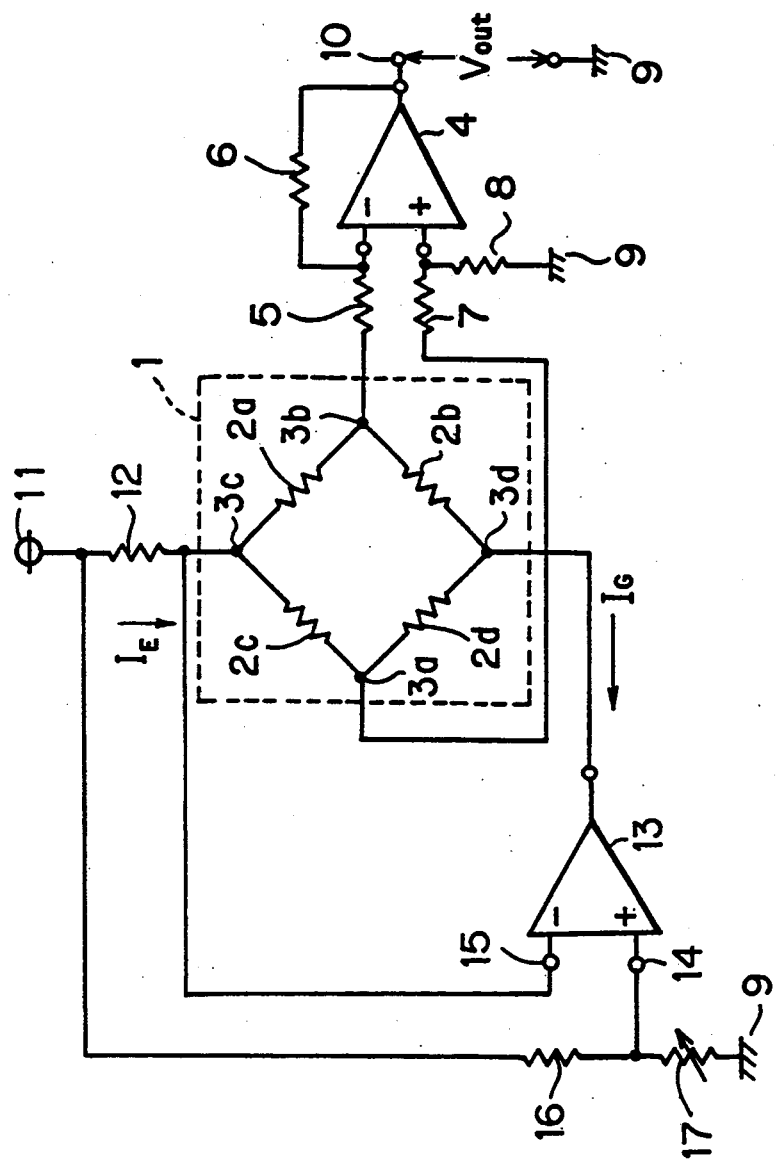
FIG. 19 is a circuit diagram showing a conventional semiconductor device having a stress transducer.

Another band gap reference voltage source shown in FIG. 17 is a reference voltage source which develops voltage based upon a potential at a power source. In FIG. 17, the refence voltage source includes resistances 70 through 74, pnp bipolar transistors 75 through 77, and output terminals 78 and 79. The resistance 70 has its first terminal grounded and its second terminal connected to first terminals of the resistances 71 through 73. A current source consist of the resistance 70 and the power source 11. A second terminal of the resistance 71 is connected to a collector and a base of the transistor 75. The transistor 75 has its emitter connected to the power source 11. The resistance 72 has its second terminal connected to a collector of the transistor 76. The transistor 76 has its base connected to a base of the transistor 75 and its emitter connected to a first terminal of the resistance 74. A second terminal of the resistance 74 is connected to the power source 11. The transistor 77 has its collector connected to a second terminal of the resistance 73, its base connected to a collector of the transistor 76, and its emitter connected to the power source 11. Reference voltage is a potential difference between the output terminal 79 connected to a first terminal of the resistance 71 and the output terminal 78 connected to the power source 11.

An operation of the reference voltage source is similar to the reference voltage source shown in FIG. 15. The reference voltage source is used as the reference voltage source 18 shown in FIG. 11 which develops voltage based upon the potential at the power source 11, for example.

As has been described, according to the present invention, a semiconductor device having a stress transducer includes a reference voltage source formed on the same substrate with a stress transducer for developing reference voltage having a temperature coefficint which compensates a temperature coefficint of sensitivity of the stress transducer, and a voltage transducer having its output terminal connected to a voltage input terminal of the stress transducer and receiving the reference voltage for outputting the resultant reference voltage transduced voltage as drive voltage to the stress transducer, where the reference voltage source compensates a temperature coefficient of sensitivity of the stress transducer while the voltage transducer adjust a drive voltage so as to correct variations in sensitivity of several stress transducers, and therefore, for example, conventional difficult work of keeping a temperature coefficient of strain gauge resistances of which the stress transducer is comprised in accord with a temperature coefficient of a piezo resistance coefficient can be excluded, and the intended semiconductor can be easily fabricated. The drive voltage compensates itself, for example, constant current which conventionally led in a bridge circuit no longer required, and therefore, a resistance of a small temperature coefficint to make the constant current is no longer required. Consequently, for example, semiconductor device having a stress transducer can be formed of diffusion resistances alone unlike the prior art where diffusion resistances and thin film resistances are required, the semiconductor device having a stress transducer can be easily formed on a single substrate, and further, such a semiconductor device having a stress transducer is low-priced.

While the invention has been shown and described in detail, the foregoing description is in all aspects illustrative and not restrictive. It is therefore understood that numerous modifications and variations can be devised without departing from the scope of the invention.

I claim:

1. A semiconductor device comprising:
   a substrate;
   a stress transducer formed on said substrate and having first voltage input terminal, for transducing stress into an electric signal by a drive voltage applied to said first voltage input terminal and by a piezo resistance effect;
   a reference voltage source formed on said substrate for developing a reference voltage having a positive temperature coefficient which compensates a temperature coefficient of a sensitivity of said stress transducer; and a voltage transducer connected between said first voltage input terminal of said stress transducer and said reference voltage source, for receiving and transducing said reference voltage to produce said drive voltage which is applied to said stress transducer, wherein said substrate includes an element for developing stress in accordance with externally-applied pressure, and said stress transducer includes an electrical bridge circuit which is activated by said drive voltage and which is comprised of voltage dropping means which is formed on said element of said substrate and exhibits said piezo resistance effect, and wherein said reference voltage source includes:

a current source having first and second terminals;

a first node connected to said first terminal of said current source;

a second node connected to said second terminal of said current source;

first, second and third voltage dropping means having respective first terminals thereof connected to said first node;

a first bipolar transistor having a first electrode thereof connected to a second terminal of said first voltage dropping means, a second electrode thereof connected to said second node, and a control electrode thereof connected to said first or second electrode thereof;

a second bipolar transistor having a first electrode thereof connected to a second terminal of said second voltage dropping means, and a control electrode thereof connected to said control electrode of said first bipolar transistor;

fourth voltage dropping means having a first terminal thereof connected to a second electrode of said second bipolar transistor and a second terminal thereof connected to said second node; and a third bipolar transistor having a first electrode thereof connected to a second terminal of said third voltage dropping means, a control electrode thereof connected to said first electrode of said second bipolar transistor, and a second electrode thereof connected to said second node, wherein a potential difference between said first node and said second node is equal to said reference voltage.

2. A semiconductor device according to claim 1, wherein said voltage dropping means of said electrical bridge circuit comprises a diffusion resistance formed by diffusing impurities into a semiconductor.

3. A semiconductor device according to claim 1, wherein said electrical bridge circuit includes a first node connected to said first voltage input terminal;

a second node to which a predetermined voltage is applied;

first voltage dropping means having a first terminal thereof connected to said first node, and exhibiting a piezo resistance effect;

second voltage dropping means having a first terminal thereof connected to said first node, and exhibiting a piezo resistance effect;

a third node connected to a second terminal of said first voltage dropping means;

a fourth node connected to a second terminal of said second voltage dropping means;

third voltage dropping means having a first terminal thereof connected to said third node and a second terminal thereof connected to said second node, and exhibiting a piezo resistance effect; and fourth voltage dropping means having a first terminal thereof connected to said fourth node and a second terminal thereof connected to said second node, and exhibiting a piezo resistance effect, wherein a potential difference between said third node and said fourth node is utilized for detecting stress.

4. A semiconductor device comprising:

a substrate;

a stress transducer formed on said substrate and having a first voltage input terminal, for transducing stress into an electric signal by a drive voltage applied to said first voltage input terminal and by a piezo resistance effect;

a reference voltage source formed on said substrate for developing a reference voltage having a positive temperature coefficient which compensates a temperature coefficient of a sensitivity of said stress transducer; and a voltage transducer connected between said first voltage input terminal of said stress transducer and said reference voltage source, for receiving and transducing said reference voltage to produce said drive voltage which is applied to said stress transducer, Wherein said substrate includes an element for developing stress in accordance with externally-applied pressure, and said stress transducer includes an electrical bridge circuit which is activated by said drive voltage and which is comprised of voltage dropping means which is formed on said element of said substrate and exhibits said piezo resistance effect, and wherein said reference voltage source includes a current source having first and second terminals, and at least one constant voltage diode having a positive temperature coefficient, said at least one constant voltage diode being connected in series between said first and second terminals of said current source in a reverse direction.

5. A semiconductor device according to claim 4, wherein said reference voltage source includes at least one diode having a negative temperature coefficient, said at least one diode being connected in series between said first and second terminals of said current source in a forward direction.

6. A semiconductor device comprising:

a substrate;

a stress transducer formed on said substrate and having a first voltage input terminal, for transducing stress into an electric signal by a drive voltage applied to said first voltage input terminal and by a piezo resistance effect, and a second voltage input terminal for receiving a second voltage which is smaller in magnitude than said drive voltage;

a reference voltage source formed on said substrate for developing a reference voltage having a positive temperature coefficient which compensates a temperature coefficient of a sensitivity of said stress transducer; and a voltage transducer connected between said first voltage input terminal of said stress transducer and said reference voltage source, for receiving and transducing said reference voltage to produce said drive voltage which is applied to said stress transducer, wherein said substrate includes an element for developing stress in accordance with externally-applied pressure, and said stress transducer includes an electrical bridge circuit which is activated by a differential voltage between said second voltage and said drive voltage, said bridge circuit being comprised of voltage dropping means which is formed on said element of said substrate and exhibits said piezo resistance effect, and wherein said reference voltage source includes:
a current source having first and second terminals;
a first node connected to said first terminal of said current source;
a second node connected to said second terminal of said current source;
first, second and third voltage dropping means having respective first terminals thereof connected to said first node;
a first bipolar transistor having a first electrode thereof connected to a second terminal of said first voltage dropping means, a second electrode thereof connected to said second node, and a control electrode thereof connected to said first or second electrode thereof;
a second bipolar transistor having a first electrode thereof connected to a second terminal of said second voltage dropping means, and a control electrode thereof connected to said control electrode of said first bipolar transistor;
fourth voltage dropping means having a first terminal thereof connected to a second electrode of said second bipolar transistor and a second terminal thereof connected to said second node; and
a third bipolar transistor having a first electrode thereof connected to a second terminal of said third voltage dropping means a control electrode thereof connected to said first electrode of said second bipolar transistor, and a second electrode thereof connected to said second node, wherein a potential difference between said first node and said second node is equal to said reference voltage.

7. A semiconductor device according to claim 6, wherein said voltage dropping means of said electrical bridge circuit comprises a diffusion resistance formed by diffusing impurities into a semiconductor.

8. A semiconductor device comprising:
a substrate;
a stress transducer formed on said substrate and having a first voltage input terminal, for transducing stress into an electric signal by a drive voltage applied to said first voltage input terminal and by piezo resistance effect;
a reference voltage source formed on said substrate for developing a reference voltage having a negative temperature coefficient which compensates a temperature coefficient of a sensitivity of said stress transducer;
a second voltage input terminal for receiving a second voltage which is larger in magnitude than said drive voltage; and
a voltage transducer connected between said first voltage input terminal of said stress transducer and said reference voltage source, for receiving and transducing said reference voltage to produce said drive voltage which is applied to said stress transducer, wherein said substrate includes an element for developing stress in accordance with externally-applied pressure, and said stress transducer includes an electrical bridge circuit which is activated by a differential voltage between said second voltage and said drive voltage, said bridge circuit being comprised of voltage dropping means which is formed on said element of said substrate and exhibits a piezo resistance effect.

9. A semiconductor device according to claim 8, wherein said reference voltage source includes a current source having first and second terminals, and at least one constant voltage diode having a negative temperature coefficient, said constant voltage diode being connected in series between said first and second terminals of said current source in a reverse direction.

10. A semiconductor device according to claim 8, wherein said reference voltage source includes a current source having first and second terminals, and at least one diode having a negative temperature coefficient, said diode being connected in series between said first and second terminals of said current source in a forward direction.

11. A semiconductor device according to claim 8, wherein said reference voltage source includes:
a current source having first and second terminals;
a first node connected to said first terminal of said current source;
a second node connected to said second terminal of said current source;
first, second, and third voltage dropping means having respective first terminals thereof connected to said first node;
a first bipolar transistor having a first electrode thereof connected to a second terminal of said first voltage dropping means, a second electrode thereof connected to said second node, and a control electrode thereof connected to said first or second electrode thereof;
a second bipolar transistor having a first electrode thereof connected to a second terminal of said second voltage dropping means, and a control electrode thereof connected to said control electrode of said first bipolar transistor;
fourth voltage dropping means having a first terminal thereof connected to a second electrode of said second bipolar transistor and a second terminal thereof connected to said second node; and
a third bipolar transistor having a first electrode thereof connected to a second terminal of said third voltage dropping means, a control electrode thereof connected to said first electrode of said second bipolar transistor, and a second electrode thereof connected to said second node, wherein a potential difference between said first node and said second node is equal to said reference voltage.

12. A semiconductor device according to claim 8, wherein said reference voltage source includes:
a current source having first and second terminals;
a first node connected to said first terminal of said current source;
a second node connected to said second terminal of said current source;
first, second and third voltage dropping means having respective first terminals thereof connected to said first node;
a first bipolar transistor having a first electrode thereof connected to a second terminal of said first voltage dropping means, and a control electrode thereof connected to said first electrode thereof or to a second electrode thereof;
a second bipolar transistor having a first electrode thereof connected to said second electrode of said first bipolar transistor, a second electrode thereof connected to said second node, and a control electrode thereof connected to said first or second electrode of said second bipolar transistor;

a third bipolar transistor having a first electrode thereof connected to a second terminal of said second voltage dropping means, and a control electrode thereof connected to said first electrode of said third bipolar transistor or to a second electrode thereof;

a fourth bipolar transistor having a first electrode thereof connected to said second electrode of said third bipolar transistor, and a control electrode thereof connected to said control electrode of said second bipolar transistor;

fourth voltage dropping means having a first terminal thereof connected to a second electrode of said fourth bipolar transistor, and a second terminal thereof connected to said second node; and a fifth bipolar transistor having a first electrode thereof connected to a second terminal of said third voltage dropping means, a control electrode thereof connected to said first electrode of said fourth bipolar transistor, and a second electrode thereof connected to said second node, wherein a potential difference between said first node and said second node is equal to said reference voltage.

13. A semiconductor device according to claim 8, wherein said electrical bridge circuit includes:

a first node connected to said first voltage input terminal;

first voltage dropping means having a first terminal thereof connected to said first node, and exhibiting a piezo resistance effect;

second voltage dropping means having a first terminal thereof connected to said first node, and exhibiting a piezo resistance effect;

a second node connected to a second terminal of said first voltage dropping means;

a third node connected to a second terminal of said second voltage dropping means;

third voltage dropping means having a first terminal thereof connected to said second node, and exhibiting a piezo resistance effect;

fourth voltage dropping means having a first terminal thereof connected to said third node, and exhibiting a piezo resistance effect; and a fourth node connected to second terminals of said third and fourth voltage dropping means and further connected to said second voltage input terminal, wherein a potential difference between said second node and said third node is utilized for detecting stress.

14. A semiconductor device according to claim 8, wherein said voltage dropping means of said electrical bridge circuit comprises a diffusion resistance formed by diffusing impurities into a semiconductor.

15. A semiconductor device comprising:

a substrate;

a stress transducer formed on said substrate and having a first voltage input terminal, for transducing stress into an electric signal by a drive voltage applied to said voltage input terminal and by a piezo resistance effect;

a reference voltage source formed on said substrate for developing a reference voltage having a temperature coefficient which compensates a temperature coefficient of a sensitivity of said stress transducer; and a voltage transducer connected between said first voltage input terminal of said stress transducer and said reference voltage source, for receiving and transducing said reference voltage to produce said drive voltage which is applied to said stress transducer, said voltage transducer including first voltage dropping means having a variable resistance value and a first terminal to which a predetermined voltage is applied, an operational amplifier having a non-inversion input terminal for receiving an output from said reference voltage source and an inversion input terminal connected to a second terminal of said first voltage dropping means, and a second voltage dropping means having a first terminal thereof connected to an output terminal of said operational amplifier and a second terminal thereof connected to said inversion input terminal of said operational amplifier, resistance values of said first and second voltage dropping means each having an identical temperature coefficient and said drive voltage being output from said output terminal of said operational amplifier, wherein said substrate includes an element for developing stress in accordance with externally-applied pressure, and said stress transducer includes an electrical bridge circuit which is comprised of voltage dropping means which is formed on said element of said substrate and exhibits a piezo resistance effect.

16. A semiconductor device according to claim 15, wherein said first voltage dropping means includes:

a non-volatile memory;

a resistance; and a switching element connected in series to said resistance in accordance with information stored in said nonvolatile memory so that a resistance value of said first voltage dropping means may be varied in accordance with said information stored in said non-volatile memory.

17. A semiconductor device according to claim 15, wherein said voltage dropping means of said electrical bridge circuit comprises a diffusion resistance formed by diffusing impurities into a semiconductor.

18. A semiconductor device according to claim 15, wherein said first voltage dropping means includes a resistance and a fuse connected in series to said resistance, said fuse being selectively broken so as to vary a resistance value of said first voltage dropping means.

19. A semiconductor device according to claim 18, wherein said fuse is selectively broken by a laser.

20. A semiconductor device according to claim 15, wherein said first voltage dropping means includes a resistance and a diode connected in parallel with said resistance so as to receive a reverse voltage, said diode being selectively short-circuited so as to vary a resistance value of said first voltage dropping means.

21. A semiconductor device according to claim 20, wherein said reverse voltage is applied to said diode so as to cause current to flow therein and brake said diode so that a short region is formed in a pn junction of said diode to short-circuit said diode.

22. A semiconductor device comprising:

a substrate;

a stress transducer formed on said substrate and having a first voltage input terminal, for transducing stress into an electric signal by a drive voltage applied to said first voltage input terminal and by piezo resistance effect;

a reference voltage source formed on said substrate for developing a reference voltage having a temperature coefficient which compensates a temperature coefficient of a sensitivity of said stress transducer; and a voltage transducer connected in series between said first voltage input terminal of said stress transducer and said reference voltage source, for receiving and transducing said reference voltage to produce said drive voltage which is applied to said stress transducer, said voltage transducer including a non-volatile memory, a digital-to-analog converter for receiving an output from said reference voltage source at an input terminal thereof and transducing said reference voltage in accordance with information stored in said non-volatile memory, and a voltage follower circuit having an input terminal thereof connected to an output terminal of said digital to analog converter, for applying said drive voltage to said stress transducer, wherein said substrate includes an element for developing stress in accordance with externally-applied pressure, and said stress transducer includes an electrical bridge circuit which is comprised of voltage dropping means which is formed on said element of said substrate and exhibits a piezo resistance effect.

* * * * *